United States Patent [19]
Meier et al.

[11] Patent Number: 6,105,129
[45] Date of Patent: Aug. 15, 2000

[54] CONVERTING REGISTER DATA FROM A FIRST FORMAT TYPE TO A SECOND FORMAT TYPE IF A SECOND TYPE INSTRUCTION CONSUMES DATA PRODUCED BY A FIRST TYPE INSTRUCTION

[75] Inventors: Stephan G. Meier, Mountain View; Norbert Juffa, San Jose, both of Calif.; Michael D. Achenbach, Austin, Tex.; Frederick D. Weber, San Jose, Calif.

[73] Assignee: Advanced Micro Devices, Inc., Sunnyvale, Calif.

[21] Appl. No.: 09/025,233

[22] Filed: Feb. 18, 1998

[51] Int. Cl.$^7$ .................................................. G06F 9/302
[52] U.S. Cl. ......................... 712/222; 712/225; 712/244
[58] Field of Search .................................... 712/221, 222, 712/225, 229, 244

[56] References Cited

U.S. PATENT DOCUMENTS

| | | |
|---|---|---|
| 4,847,802 | 7/1989 | Ashton . |
| 5,481,489 | 1/1996 | Yanagida . |
| 5,560,035 | 9/1996 | Garg et al. . |
| 5,701,508 | 12/1997 | Glew et al. . |
| 5,740,441 | 4/1998 | Yellin et al. . |
| 5,748,516 | 5/1998 | Goddard et al. . |
| 5,751,981 | 5/1998 | Witt et al. . |
| 5,805,475 | 9/1998 | Purino et al. . |
| 5,812,813 | 9/1998 | Henry et al. ............................ 712/218 |
| 5,825,678 | 10/1998 | Smith . |
| 5,978,901 | 11/1999 | Luedtke et al. ......................... 712/222 |

FOREIGN PATENT DOCUMENTS

| | | |
|---|---|---|
| 85/03148 | 7/1985 | WIPO . |

OTHER PUBLICATIONS

Intel, *Pentium Processor Family Developer's Manual,*, pp. 2–13 to 2–20, 1997.

Intel, *Intel Architecture Software Developer's Manual, vol. 3: System Programming Guide*, pp. 10–1 to 10–9, 1997.

IBM Technical Disclosure Bulletin, "Floating Point Data Type Tag," vol. 39, No. 7, Jul. 1996, pp. 265 (1 sheet).

*Primary Examiner*—Richard L. Ellis
*Attorney, Agent, or Firm*—Conley, Rose & Tayon, P.C.; Lawrence J. Merkel

[57] ABSTRACT

A microprocessor includes one or more registers which are architecturally defined to be used for at least two data formats. In one embodiment, the registers are the floating point registers defined in the x86 architecture, and the data formats are the floating point data format and the multimedia data format. The registers actually implemented by the microprocessor for the floating point registers use an internal format for floating point data. Part of the internal format is a classification field which classifies the floating point data in the extended precision defined by the x86 microprocessor architecture. Additionally, a classification field encoding is reserved for multimedia data. As the microprocessor begins execution of each multimedia instruction, the classification information of the source operands is examined to determine if the data is either in the multimedia class, or in a floating point class in which the significand portion of the register is the same as the corresponding significand in extended precision. If so, the multimedia instruction executes normally. If not, the multimedia instruction is faulted. Similarly, as the microprocessor begins execution of each floating point instruction, the classification information of the source operands is examined. If the data is classified as multimedia, the floating point instruction is faulted. A microcode routine is used to reformat the data stored in at least the source registers of the faulting instruction into a format useable by the faulting instruction. Subsequently, the faulting instruction is re-executed.

49 Claims, 14 Drawing Sheets

| Class | Type | Encoding |
|---|---|---|
| Unsupported | Floating Point | 0 |
| SNAN | Floating Point | 1 |
| Normal | Floating Point | 2 |
| Infinity | Floating Point | 3 |
| Zero | Floating Point | 4 |
| QNAN | Floating Point | 5 |
| Denorm | Floating Point | 6 |
| Multimedia | Multimedia | 7 |

198

CONVERTING REGISTER DATA FROM A FIRST FORMAT TYPE TO A SECOND FORMAT TYPE IF A SECOND TYPE INSTRUCTION CONSUMES DATA PRODUCED BY A FIRST TYPE INSTRUCTION

BACKGROUND OF THE INVENTION

1. Field of the Invention

This invention relates to the field of microprocessors and, more particularly, to the sharing of one or more registers between execution units of different types.

2. Description of the Related Art

Microprocessors are often configured to operate upon a variety of data types in order to provide computational solutions to a wide range of problems. For example, integer and floating point data types are common. The integer data type may be used in the case where the values to be operated upon are of approximately the same magnitude (as well as any intermediate results calculated in order to produce the results of interest). On the other hand, if the magnitudes of the values to be operated upon (or the intermediate results) are expected to vary widely, then the floating point data type may be more appropriate.

The data type used by each instruction within the instruction set is typically predefined as part of the instruction definition. For example, integer instructions are instructions which are defined to operate upon the integer data type. Similarly, floating point instructions are defined to operate upon the floating point data type. Generally, an instruction is the most basic operation which the programmer can specify in order to direct the microprocessor to perform a desired function. By arranging instructions in a particular order, the programmer may accomplish a specific objective. Instructions may be grouped with other instructions to form different instruction types according to the data type upon which they are defined to operate. Typically, an instruction is defined to receive one or more operands upon which to perform an operation (the "source operands") and is defined to store the result (the "destination operand").

As advances in semiconductor fabrication processes have been developed, it has become possible to increase the number of transistors which can be included upon a single chip and increase the operating frequencies of the chips. Accordingly, microprocessors have been able to increase performance through increased operating frequencies (i.e. shorter clock cycles) as well as through advanced microarchitectures made possible by the increase in available transistors.

One way to take advantage of the increase in available transistors is to add new data types to the microprocessor. The new data types may be specifically designed with a particular task in mind. The data type, and the instructions defined to operate upon the data type, may be optimized for the particular task. For example, the x86 instruction set has recently been expanded in this fashion. While previous microprocessors which implement the x86 instruction set (e.g. the 80486 from Intel Corporation and the $5_K86$ from Advanced Micro Devices, Inc.) generally execute instructions specifying the floating point and integer data types, the most recent microprocessors implementations also execute instructions specifying the MMX data type. The MMX data type is a 64 bit operand treated as a set of packed integers. The packed integers may be eight 8 bit integers, four 16 bit integers, or two 32 bit integers.

The MMX data type and instructions which use the data type are optimized for video and audio data manipulations. Audio and/or video manipulation is referred to herein as "multimedia manipulation". These types of operations have become more important as computer systems have employed more advanced graphical user interfaces via the operating systems and application programs installed thereon. Additionally, the audio capabilities of computer systems have been enhanced. More particularly, the MMX data type allows for the same operation to be performed upon each of the integer values within the packed integer. Fewer instructions may be employed to perform the desired manipulations then would have otherwise been required, since one instruction may operate upon multiple values. For many video and/or audio computing tasks, the same operation is applied to a large number of data elements arranged for display or playback, and therefore instructions which perform the same operation upon multiple data elements may be advantageous.

In order to minimize the impact upon operating systems designed for the x86 architecture prior to the addition of the MMX data type and instructions, the registers defined to store the MMX operands are defined to be shared with the floating point registers. In other words, the MMX registers are architecturally defined to use the same storage locations as the floating point registers. In this manner, no new state is added to the microprocessor. Operating systems which do not recognize MMX instructions may still operate properly, as the data being used by the MMX instructions is stored in the same set of registers as the floating point data. Since these operating systems were already handling the floating point registers, the MMX registers are automatically handled.

The sharing of registers between data types may be advantageous for operating system compatibility, but creates additional hardware problems for microprocessors supporting the new data type and instructions. While it is generally illogical to store a value of one data type in a shared register and then use the shared register as a source operand for an instruction operating upon a different data type, it is desirable to provide defined behavior in such situations. In order to maintain compatibility with software written using the new data types, it is desirable to maintain this defined behavior when designing microprocessors which implement the architecture.

Another technique which may be desirable with certain data types is to store the data in an internal format. The internal format may differ from the architected format (defined by the architecture implemented by the microprocessor). More particularly, the internal format may allow for hardware optimizations to be made which may allow for more rapid execution of the instructions which use that data format. Higher frequency implementations of these types of execution units may thereby be achieved. Unfortunately, if the data type which uses the internal format is allocated to registers which are shared with another data type, the defined behavior when an instruction using one of the data types accesses a value which is actually of the other data type is destroyed. A method for allowing internal formats to be used for a data type which shares one or more registers with a different data type is therefore needed.

SUMMARY OF THE INVENTION

The problems outlined above are in large part solved by a microprocessor in accordance with the present invention. The microprocessor includes one or more registers which are architecturally defined to be used for at least two data formats. In one embodiment, the registers are the floating point registers defined in the x86 architecture, and the data formats are the floating point data format and the multimedia data format. The registers actually implemented by the microprocessor for the floating point registers use an internal format for floating point data. Part of the internal format is a classification field which classifies the floating point data in the extended precision defined by the x86 microprocessor architecture. Additionally, a classification field encoding is reserved for multimedia data.

As the microprocessor begins execution of each multimedia instruction, the classification information of the source operands is examined to determine if the data is either in the multimedia class, or in a floating point class in which the significand portion of the register is the same as the corresponding significand in extended precision. If so, the multimedia instruction executes normally. If not, the multimedia instruction is faulted. Similarly, as the microprocessor begins execution of each floating point instruction, the classification information of the source operands is examined. If the data is classified as multimedia, the floating point instruction is faulted. A microcode routine is used to reformat the data stored in at least the source registers of the faulting instruction into a format useable by the faulting instruction. Subsequently, the faulting instruction is re-executed.

Advantageously, an internal format is supported for one of the data types stored in the shared register, and use of data in the internal format by an instruction expecting the other data type is detected using the classification data. By faulting the instruction and formatting the data properly for the faulting instruction, execution compatibility with previous versions of the architecture may be achieved. Additionally, the compatibility may be achieved without requiring a substantial amount of hardware, as the conversion may be handled via microcode. The operation of the unit using the internal format (e.g. the floating point unit) may be enhanced by allowing the internal format and the data classification, and correct operation can be ensured using the classification data as well.

Broadly speaking, the present invention contemplates a method for managing access to one or more registers which are shared by a first execution unit of a first type and a second execution unit of a second type different than the first type. A first register within the one or more registers is updated responsive to a first instruction executed in the first execution unit. A second instruction executable by the second execution unit is faulted if the second instruction has the first register as a source operand. Data stored in the first register is converted from a first format used by the first execution unit to a second format used by the second execution unit responsive to the faulting of the second instruction. The second instruction is executed subsequent to the aforementioned converting.

The present invention further contemplates a microprocessor comprising at least one register, a first execution unit, a second execution unit, a reorder buffer, and a microcode unit. The register is accessible responsive to both a first type of instructions and a second type of instructions. The first execution unit is configured to execute the first type of instructions, and is further configured to store a result from executing the first type of instructions into the register in a first format. The first execution unit is configured to fault a first instruction of the first type which accesses the register if the register is storing data in a second format different from the first format. The second execution unit is configured to execute the second type of instructions, and is further configured to store a result from executing the second type of instructions into the register in the second format. Additionally, the second execution unit is configured to fault a second instruction of the second type which accesses the register if the register is storing data in the first format. Coupled to the first and second execution units, the reorder buffer is configured to signal a microcode unit upon selecting the first instruction or the second instruction for retirement. The microcode unit is configured to dispatch a routine responsive to the signal from the reorder buffer.

BRIEF DESCRIPTION OF THE DRAWINGS

Other objects and advantages of the invention will become apparent upon reading the following detailed description and upon reference to the accompanying drawings in which.

Figure 1:
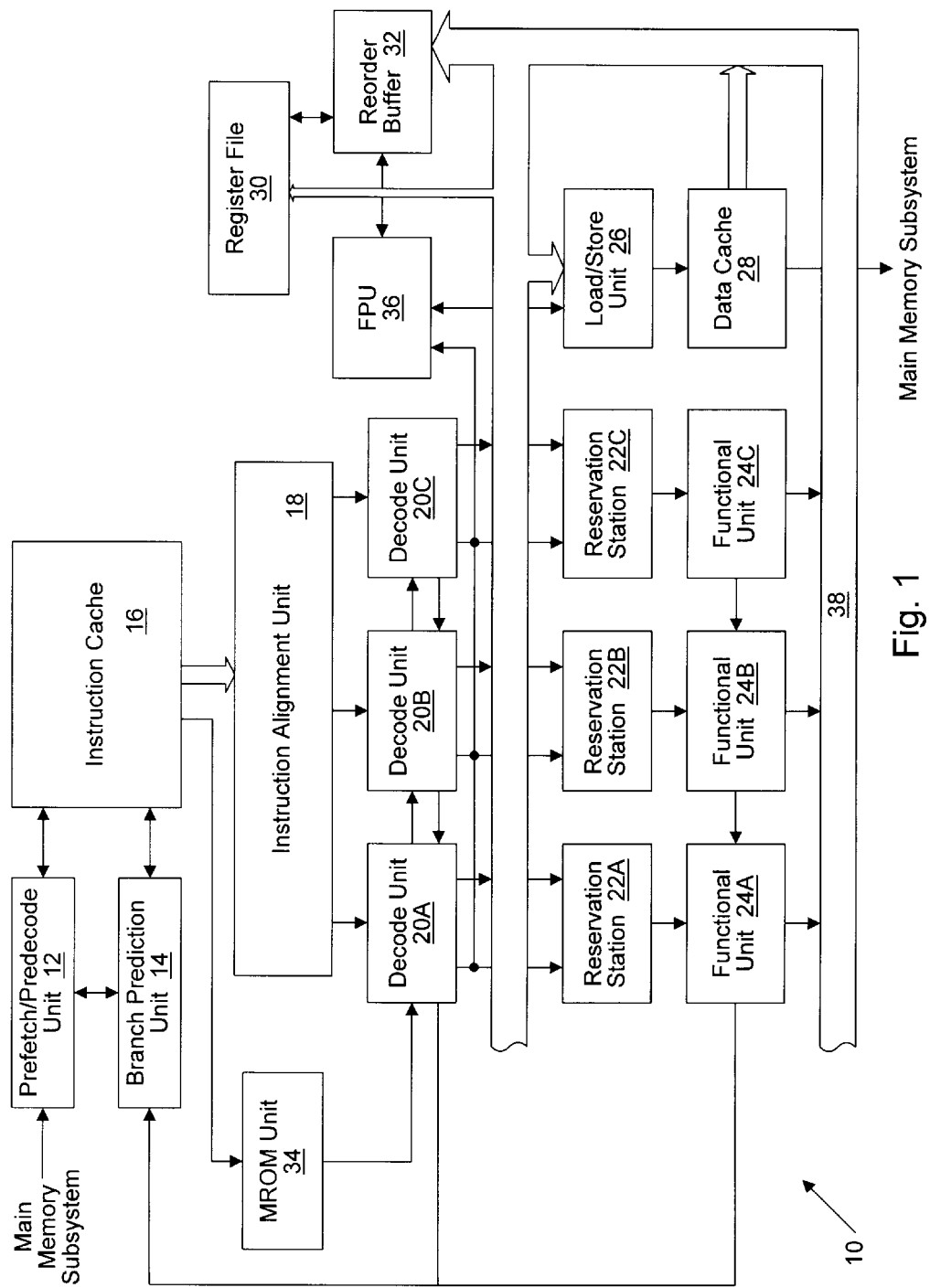
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Other embodiments are possible and contemplated. As shown in FIG. 1, microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating point unit (FPU) 36. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C, as well as to FPU 36. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. FPU 36 is additionally coupled to load/store unit 26 and reorder buffer 32. Finally, MROM unit 34 is coupled to decode units 20 and to reorder buffer 32.

Generally speaking, FPU 36 is provided to execute floating point and multimedia instructions. Floating point and multimedia instructions are detected by decode units 20 and routed to FPU 36 as well as to reorder buffer 32. If these instructions include load/store memory operations, the load/store memory operations are performed by load/store unit 26. Address generation for the load/store memory operations may be performed by functional units 24. Certain floating point and/or multimedia instructions may be implemented via microcode routines in MROM unit 34. FPU 36 executes the instructions provided thereto, and indicates any exceptions (or lack thereof) to reorder buffer 32. Reorder buffer 32 indicates when instructions can be retired, at which time FPU 36 updates its architected state to reflect execution of the instructions.

As used herein, the term "multimedia instructions" refers to a set of instructions defined to accelerate the performance of multimedia (e.g. audio and video) manipulations. For example, the MMX instructions defined by the x86 architecture may be multimedia instructions in embodiments of microprocessor 10 which employ the x86 architecture. Additionally, the floating point instructions optimized for three dimensional graphics calculations (described below) may be multimedia instructions. FPU 36 includes a register file including the architected floating point registers. The multimedia instructions are also defined to use the floating point registers to retrieve and store operands.

FPU 36 employs an internal format for floating point data. The internal format differs from the architected format. A data format refers to the arrangement of the data within the provided storage (e.g. a register). The value stored is interpreted in light of the format in order to determine the numerical meaning of the value (or lack thereof, e.g. for SNAN, QNAN, or unsupported encodings). An architected format is the format assigned by the architecture defining the instructions (i.e. the format expected by the programmer). Internal formats may differ from the architected format as long as the results stored externally (e.g. to memory or I/O devices) adheres to the architected format and the execution behavior of instructions which use the data stored in the internal format is identical to the corresponding architected format.

In order to achieve compatible behavior when multimedia instructions access operands stored by floating point instructions (i.e. multimedia instruction "consuming" floating point data) or when floating point instructions consume multimedia data, one or more microcode routines are employed within MROM unit 34. Prior to executing a given floating point or multimedia instruction, FPU 36 detects if the source operand data is correctly formatted for the instruction. If the wrong format is detected, FPU 36 reports a fault for the instruction to reorder buffer 32. When reorder buffer 32 selects the faulted instruction for retirement, reorder buffer 32 invokes the appropriate microcode routine for the fault. The microcode routine includes instructions which convert the multimedia format into the floating point (internal) format, or vice versa, depending upon the faulting instruction. At least the registers providing source operands to the faulted instruction are converted. Various embodiments are detailed below for performing the conversion. After the conversion is complete, the faulted instruction is re-executed.

FPU 36 may therefore enjoy the advantages of using an internal data format for floating point data while maintaining compatibility with previous implementations of the architecture which support the multimedia data type. Furthermore, a substantial portion of the solutions described herein is implemented in microcode. Therefore, little additional hardware is needed to provide compatibility as well as the internal floating point data format.

It is noted that FPU 36 may employ a floating point model which is compliant with IEEE 754 and 854 standards for floating point arithmetic. It is further noted that, while the present embodiment describes the sharing of registers between floating point and multimedia data types, the method and apparatus described herein may be applied to any data types which share registers.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 4 way set associative structure having 32 byte lines (a byte comprises 8 binary bits). Alternatively, 2 way set associativity may be employed as well as any other desired associativity. Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

Start bits 10000
End bits 00001
Functional bits 11000

According to one particular embodiment, early identification of an instruction that includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26. In one particular embodiment, each functional unit 24 may comprise an address generation unit for generating addresses and an execute unit for performing the remaining functions. The two units may operate independently upon different instructions during a clock cycle.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32. It is further noted that branch execution results may be provided by functional units 24 to reorder buffer 32, which may indicate branch mispredictions to functional units 24.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
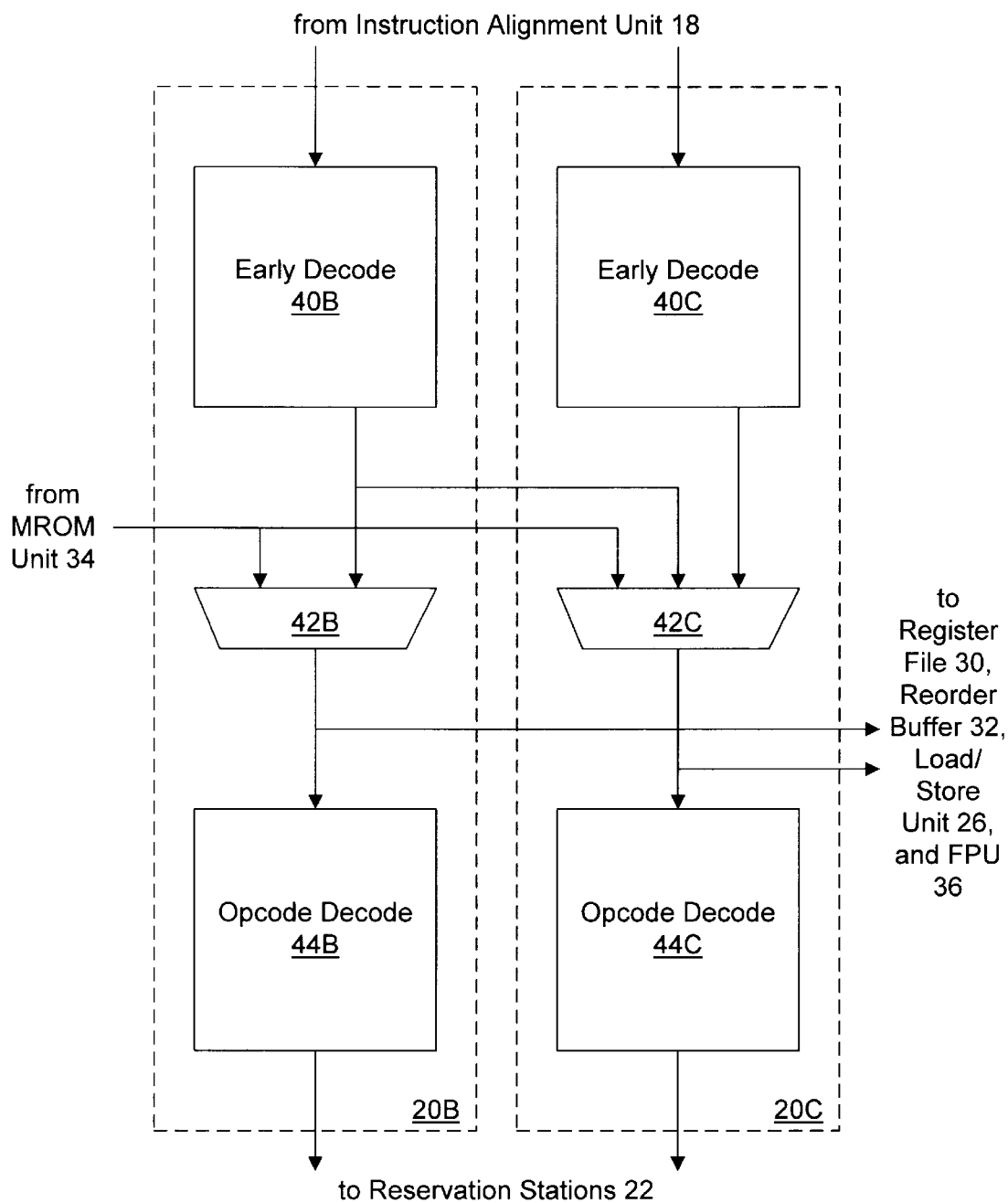
FIG. 2 is a block diagram of one embodiment of a pair of decode units shown in FIG. 1.

Turning now to FIG. 2, a block diagram of one embodiment of decode units 20B and 20C is shown. Other embodiments are possible and contemplated. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26. Finally, the outputs of multiplexors 42 are routed to FPU 36 for dispatching of floating point instructions.

Figure 3:
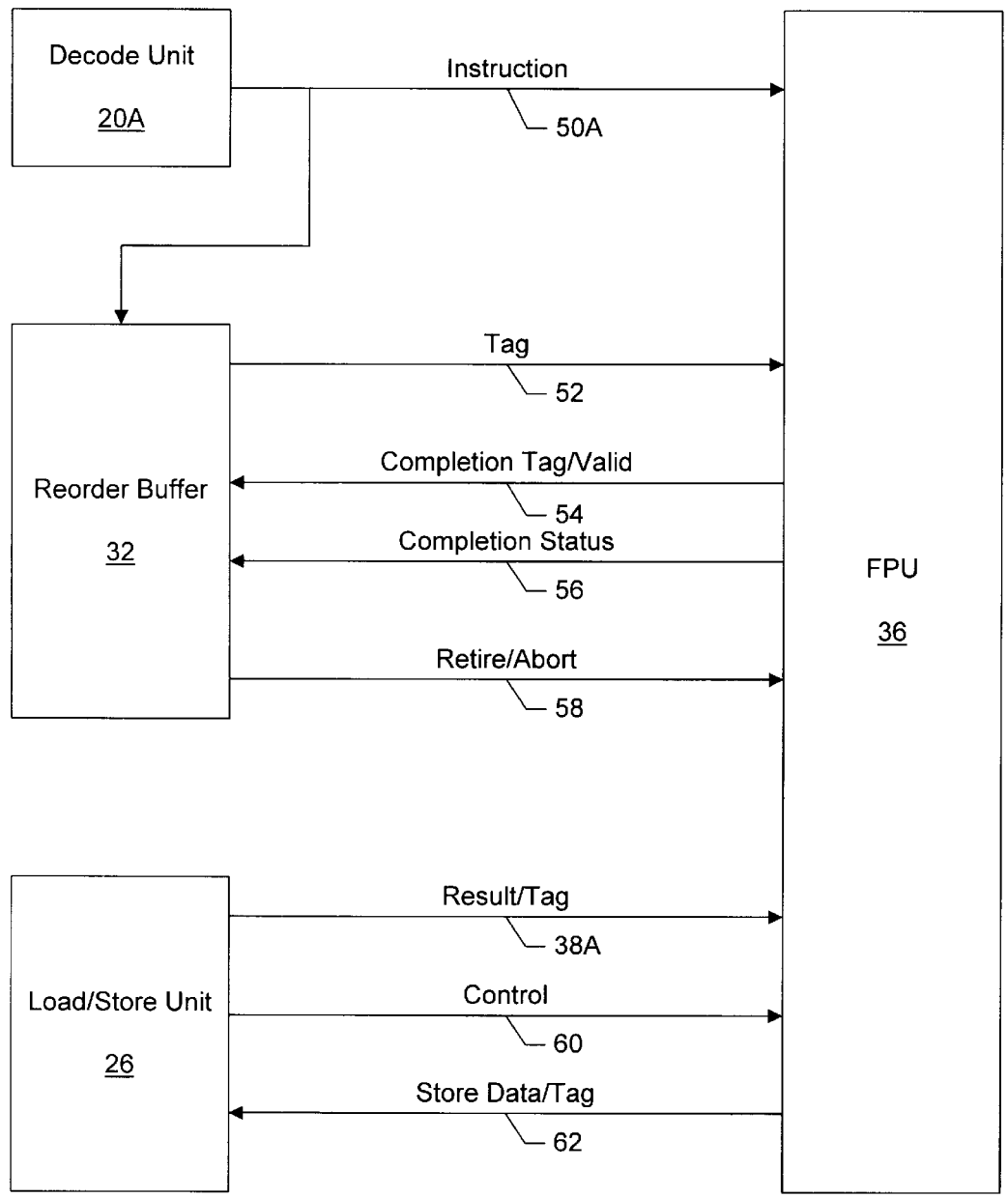
FIG. 3 is a block diagram of one embodiment of a floating point unit, a decode unit, a reorder buffer, and a load/store unit shown in FIG. 1, highlighting interconnection therebetween according to one embodiment of the microprocessor.

Turning now to FIG. 3, a block diagram illustrating one embodiment of certain interconnect between decode unit 20A, reorder buffer 32, load/store unit 26, and FPU 36 is shown. Other embodiments are possible and contemplated, and additional interconnect may be provided as desired. Furthermore, interconnect similar to that shown between decode unit 20A and FPU 36 may be employed between decode units 20B–20C and FPU 36.

Decode unit 20A, upon decoding a floating point or multimedia instruction, dispatches the instruction to FPU 36 upon an instruction bus 50A. Additionally, if MROM unit 34 is dispatching instructions which are to be routed to FPU 36, instruction bus 50A is used. Instruction bus 50A may, for example, comprise the output of a multiplexor similar to muxes 42B and 42C in FIG. 2 along with a floating point valid signal indicating the instruction is being provided. Reorder buffer 32 is also coupled to receive at least a portion of instruction bus 50A. Reorder buffer 32 stores an indication of the instruction being conveyed to FPU 36. A reorder buffer tag is conveyed upon tag bus 52 indicating the storage location within reorder buffer 32 assigned to the instruction upon instruction bus 50A. The reorder buffer tag is used to identify the instruction at completion and retirement, as well as for load/store memory operations corresponding to the instruction. In one embodiment, reorder buffer 32 is a line-oriented reorder buffer as described above. The reorder buffer tag upon tag bus 52 is the line portion of the tag for such an embodiment. The offset portion for each instruction received by FPU 36 during the clock cycle is determined by which decode unit 20A–20C the instruction is received from.

Upon executing each instruction, FPU 36 conveys completion information to reorder buffer 32. A completion tag/valid bus 54 is used to convey a reorder buffer tag corresponding to each instruction completing during the clock cycle. In one embodiment, up to three instructions may complete during a clock cycle. Therefore, up to three tags may be conveyed upon completion tag/valid bus 54. Additionally, a valid indication corresponding to each tag is conveyed upon completion tag/valid bus 54. In an embodiment employing a line-oriented reorder buffer such as reorder buffer 32, the reorder buffer tag conveyed for each instruction upon completion tag/valid bus 54 includes the line portion as well as the offset portion, so that a particular instruction is identified as completing.

Additionally, the completion status for each instruction is conveyed upon completion status bus 56. Completion status bus 56 indicates whether or not an exception is detected for the instruction(s) being completed. Exceptions may occur for a variety of reasons. First, certain exceptions are architecturally defined to occur (for example, when denormalized or non-numeric results are generated, if the corresponding exceptions are not masked). Second, microprocessor 10 may include microarchitectural exceptions. The microarchitectural exceptions may be handled in a variety of manners. For example, microcode routines may be invoked to correct the exceptional condition and allow instruction execution to be restarted. Two types of microarchitectural exceptions are employed in one embodiment: traps and faults. A trap causes a microcode routine to be invoked after the instruction experiencing the exception is retired. Instructions subsequent to the trapping instruction are flushed from reorder buffer 32 and FPU 36. A fault causes a microcode routine to be invoked and the instruction experiencing the exception is not retired (i.e. it is flushed, along with subsequent instructions).

Generally, completion status bus 56 carries an indication of either no exception or an indication of the type of exception generated. Reorder buffer 32 records the completion status, and takes action on the status when the corresponding instruction is selected for retirement. Reorder buffer 32 may invoke a microcode routine, or may direct instruction fetching to a predefined address, depending upon the exception.

Reorder buffer 32 signals retirement of instructions executed by FPU 36 via retire/abort bus 58. Reorder buffer 32 retires instructions in program order, and a retire unit within FPU 36 maintains instructions in program order as well. Accordingly, reorder buffer 32 may assert a signal for each instruction within the line which is selected for retirement. Additionally, reorder buffer 32 may assert an abort signal for one or more instructions if the instruction's results are to be discarded instead of retired (e.g. because an exception has been detected).

FPU 36 and load/store unit 20 communicate for load/store memory operations. Load/store unit 26 conveys load memory operation results and corresponding reorder buffer tags via a result bus 38A (one of result buses 38 shown in FIG. 1). In one embodiment, up to two load memory operations may be forwarded via result bus 38A during a particular clock cycle (i.e. result bus 38A may include enough lines to carry two tags and two result data). Additionally, control information regarding the load memory operation(s) is conveyed via a control bus 60. Control bus 60 may include cache hit/miss information as well as cancellation information if a memory dependency or other stall condition is detected. Finally, FPU 36 conveys store data for store memory operations (and a corresponding reorder buffer tag) to load/store unit 26 via a store data/tag bus 62. After receiving store data from FPU 36, load/store unit 26 completes the store memory operation to memory via data cache 28.

Figure 4:
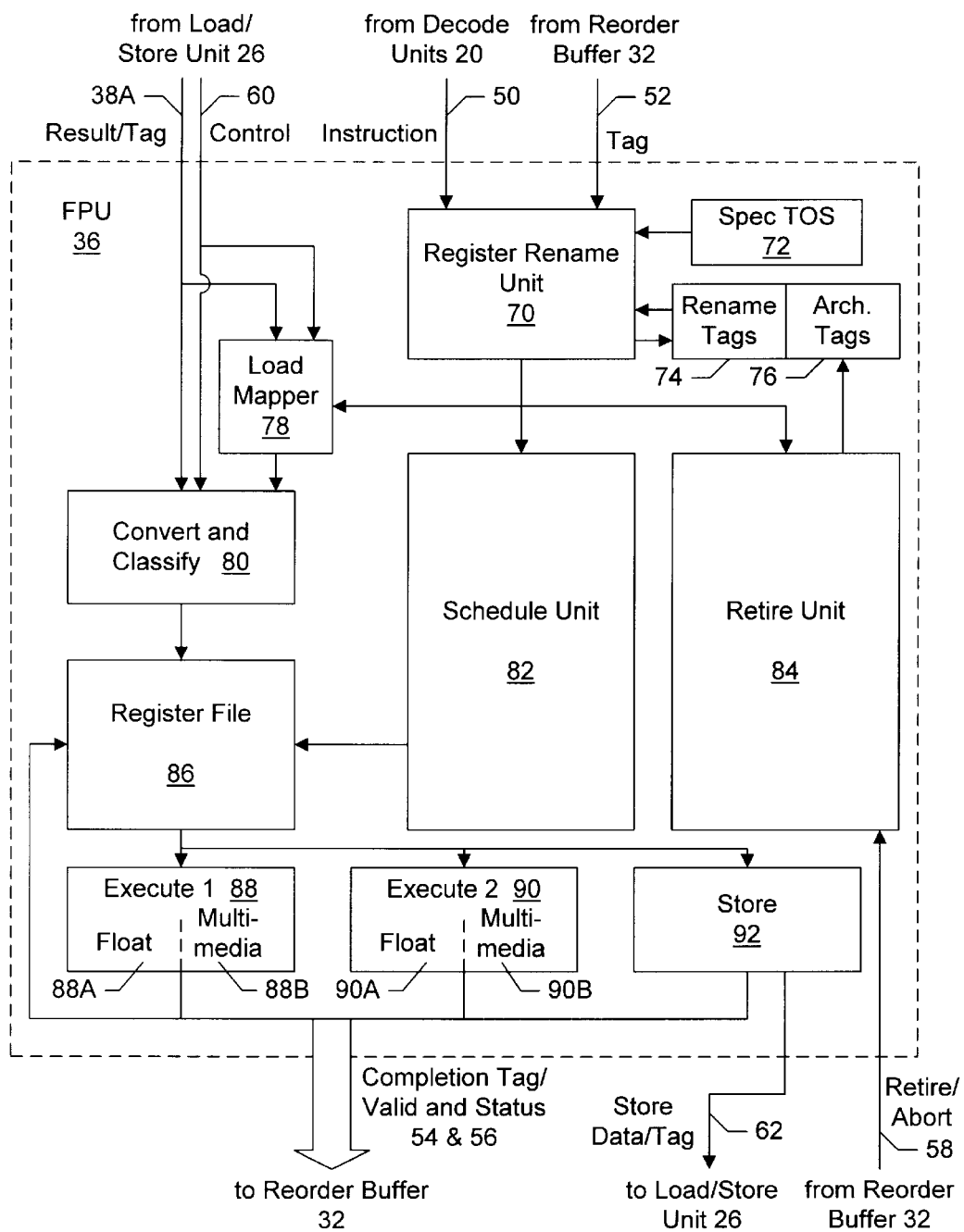
FIG. 4 is a block diagram of one embodiment of the floating point unit shown in FIGS. 1 and 3.

Turning now to FIG. 4, a block diagram of one embodiment of FPU 36 is shown. Other embodiments are possible and contemplated. As shown in FIG. 4, FPU 36 includes a register rename unit 70, a speculative top of stack state 72, a rename tags 74, a architected tags 76, a load mapper 78, a convert and classify block 80, a schedule unit 82, a retire unit 84, a register file 86, an execute 1 block 88, an execute 2 block 90, and a store block 92. Execute 1 block 88 includes a floating point execution unit 88A and a multimedia execution unit 88B. Similarly, execute 2 block 90 includes a floating point execution unit 90A and a multimedia execution unit 90B. Result/tag bus 38A and control bus 60 are coupled to load mapper 78 and to convert and classify block 80. Instruction buses 50 (including instruction bus 50A from decode unit 20A and similar buses from other decode units 20B–20C) are coupled to register rename unit 70. Similarly, tag bus 52 is coupled to register rename unit 70. Register rename unit 70 is coupled to speculative top of stack state 72 and rename tags 74. Additionally, register rename unit 70 is coupled to load mapper 78, schedule unit 82, and retire unit 84. Retire unit 84 is coupled to architected tags 76 and to retire/abort bus 58 from reorder buffer 32. Schedule unit 82 is coupled to register file 86, which is further coupled to convert and classify block 80, execute 1 block 88, execute 2 block 90, and store block 92. Store block 92 is coupled to store data/tag bus 62. Additionally, each of blocks 88, 90, and 92 are coupled to provide portions of completion tag/valid bus 54 and completion status bus 56 to reorder buffer 32.

Generally, instructions are received into FPU 36 with their corresponding reorder buffer tag via instruction buses 50 and tag bus 52. Register renaming unit 70 performs true register renaming upon the register operands of the instruction and assigns an execute block (88, 90, or 92) to execute the instruction. Source registers are renamed using the rename tags 74 (which maps each architected register to its current rename within register file 86). Additionally, the destination register is assigned a rename from the registers which are not currently in use as renames for outstanding instructions. Rename tags 74 are updated with the new destination registers. The instruction and register renames are then passed to schedule unit 82, retire unit 84, and load mapper 78. The instruction remains in schedule unit 82 until its source operands become available (via prior instruction execution or load memory operation from load/store unit 26, if the instruction includes a memory operand). Once its operands are available, the instruction may be selected for dispatch. Upon selection, the instruction is conveyed to its assigned execute block 88, 90, or 92. Additionally, the source register operands are read from register file 86 and conveyed to the corresponding block 88, 90, or 92. Preferably, scheduler unit 82 allows for out of order instruction execution. Only instructions having dependencies on each other are forced to execute in order.

Blocks 88, 90, and 92 execute the instructions and provide execution results to register file 86 for storage in the destination register assigned via register rename unit 70. Registers may be updated speculatively upon instruction execution as the architected state is indicated via architected tags 76, which are updated to identify the architected registers within register file 86 as instructions are retired. Additionally, each block provides the reorder buffer tag of the instruction being executed upon completion tag/valid bus 54 and corresponding completion status upon completion status bus 56. Different instructions may execute in different numbers of clock cycles in blocks 88, 90, and 92. However, the units are pipelined to typically allow for a new instruction to be dispatched to each block during each clock cycle. Store block 92 is provided for converting store data to the format to be stored in memory (extended, double, or single precision for floating point values, or 64 bits of multimedia data for multimedia instructions). The converted store data and corresponding reorder buffer tag are conveyed to load/store unit 26 via store data/tag bus 62. Furthermore, store block 92 may be configured to execute single source register-to-register instructions as well.

Reorder buffer 32 conveys retire/abort information for each instruction upon retire/abort bus 58. For each instruction that is retired, retire unit 84 updates architected tags 76 to indicate that the architected value for the destination register of that instruction is stored in the rename register within register file 86 assigned to that instruction. If an abort is received, retire unit 84 and schedule unit 82 discard any instructions subsequent to the aborted instruction. Additionally, the rename tags 74 are overwritten by the architected tags 76 to recover the rename tags 74. Speculative top of stack state 72 is recovered as well from the non-speculative top of stack (stored in an architected control register).

As mentioned above, each of execute 1 block 88 and execute 2 block 90 include a floating point execution unit and a multimedia execution unit. Because floating point instructions and multimedia instructions operate upon different data formats, the hardware used for performing floating point operations is substantially different from the hardware used for performing multimedia operations. Multimedia instructions are generally low latency, high performance instructions while the floating point instructions implement a more complex, IEEE standard floating point arithmetic which may take several clock cycles to complete.

In order to reduce the amount of time needed to execute floating point operations, floating point execution units 88A and 90A use an internal format for floating point data (and the data is stored in register file 86 in the internal format). The internal format includes a larger number of bits for the exponent than the highest precision floating point number supported by the architected formats. By including more exponent bits, even denormal numbers (numbers in which the significand is less than one) within the highest precision can be expressed as normal numbers in the internal format. Therefore, floating point execution units 88A and 90A always receive floating point data in normal form. Floating point execution units 88A and 90A may thereby be simplified because the hardware therein need not handle denormal numbers.

In order to correctly detect exceptions (and to detect them rapidly), floating point execution units 88A and 90A generate classification information for each floating point execution result. The classification information indicates what type of number is represented by the internal format (if that number were expressed in one of the architected formats). For example, a number could be a normal number, a denormal number (or denorm), infinity, zero, etc. The classification information is part of the internal format and is stored in the destination register within register file 86.

Convert and classify block 80 converts the load data received from load/store unit 26 for floating point instructions into the internal format. First, the load data is converted to the precision corresponding to the internal format by convert and classify block 80. For example, the x86 architecture specifies that the floating point data may be represented in memory in one of three formats: (i) the extended precision format (including one sign bit, 15 bits of biased exponent, and 64 bits of significand including the bit to the left of the decimal point); (ii) the double precision format (including one sign bit, 11 bits of biased exponent, and 53 bits of significand where the bit to the left of the exponent is implied and therefore not stored); and (iii) the single precision format (including one sign bit, 8 bits of exponent, and 24 bits of significand where the bit to the left of the exponent is implied and therefore not stored). Additionally, the x86 architecture specifies that the floating point registers store data in the extended precision format. Convert and classify unit 80 converts load data into the internal format for floating point numbers and classifies the data according to the extended precision format. The internal format may therefore simplify the floating point hardware and the classification information can be used to ensure operation according to the extended format. The classification information can be used to rapidly determine the extended precision class of the number, as opposed to examining the entire internal format to determine that information.

Load mapper 78 specifies the destination register for the load data, as assigned by register rename unit 70. Load mapper 78 receives the destination register rename from register rename unit 70, and stores the destination register rename according to the reorder buffer tag of the instruction, and is indexed by the reorder buffer tag provided from load/store unit 26. In this manner, the destination register for the load data is determined. Once convert and classify block 80 completes its conversion, the data is stored into the destination register.

Floating point execution units 88A and 90A may use the classification data to further simplify operation. For example, if floating point execution units 88A and 90A determine that zero is the result of an operation, floating point execution units 88A and 90A may bypass generation of the internal format of zero (for the exponent and significand) and instead write the classification data to indicate zero. If the data is subsequently used by a floating point execution unit 88A or 90A, the classification as zero will cause proper arithmetic operation even though the exponent and significand have not been updated to the zero format.

Unfortunately, since the internal format for floating point numbers differs in its representation of certain numbers from the architected format of the floating point registers, if data produced by a floating point instruction is consumed by a multimedia instruction, the data read from the registers may be incorrectly formatted. For example, if the floating point data is denormal, the multimedia instruction is defined to receive the significand in denormal form (i.e. the numerical value of the significand is less than one) as its operand. However, the significand is actually stored in the register in normal form and the classification information indicates that the number is a denorm. Additionally, the classification information may be the only indication that a particular floating point number is zero (i.e. the significand may not have been updated to indicate zero).

Multimedia units 88B and 90B are configured to detect classifications of denorm and zero and to generate a fault status to reorder buffer 32 in response. Reorder buffer 32 faults the instruction and generates an entry point for a microcode routine which changes the data stored in at least the registers accessed by the faulted multimedia instruction into a format usable by multimedia units 88B and 90B. A classification encoding is reserved for multimedia instructions, and the classification is changed to the multimedia encoding. The faulted instruction is then reattempted after the microcode routine completes.

Multimedia units 88B and 90B, being low latency units, may not be configured to generate floating-point-style classification data. Instead, the multimedia units 88B and 90B, when updating a register in response to execution of a multimedia instruction, update the classification information in that register to the multimedia encoding. Additionally, the exponent field of the register is updated to a predetermined value (referred to below as EXPO_multimedia). Updating the classification ensures that, if a floating point instruction attempts to consume data written by a multimedia instruction, the classification can be used to fault the floating point instruction. Updating the exponent field allows for the microcode routine to discern whether a particular register is classified as multimedia due to a previous conversion (due to a fault on a multimedia instruction) or whether the register has actually been updated by a multimedia instruction.

Floating point execution units 88A and 90A detect the multimedia encoding of the classification and generate a fault status for the corresponding floating point instruction to reorder buffer 32 if the encoding is detected. Reorder buffer 32 faults the instruction and generates an entry point for a microcode routine which changes the data stored in at least the registers accessed by the faulted floating point instruction into the correct floating point format. The classification is updated accordingly. The faulted instruction is then reattempted after the microcode routine completes.

As mentioned above, in one embodiment FPU 36 implements the floating point instructions defined by the x86 architecture. The x86 floating point treats the registers as a stack, with a top of stack pointer indicating which register is the current top of stack. Speculative top of stack state 72 stores a speculative copy of the top of stack indication for use by register rename unit 70. Prior to assigning renames, the stack relative registers specified by the floating point registers are converted to non-stack relative register identifiers (absolute register identifiers). Register renaming is then performed upon the absolute register identifiers. Multimedia instructions, on the other hand, are encoded with absolute register identifiers and therefore are not modified with respect to speculative top of stack state 72.

Figure 5:
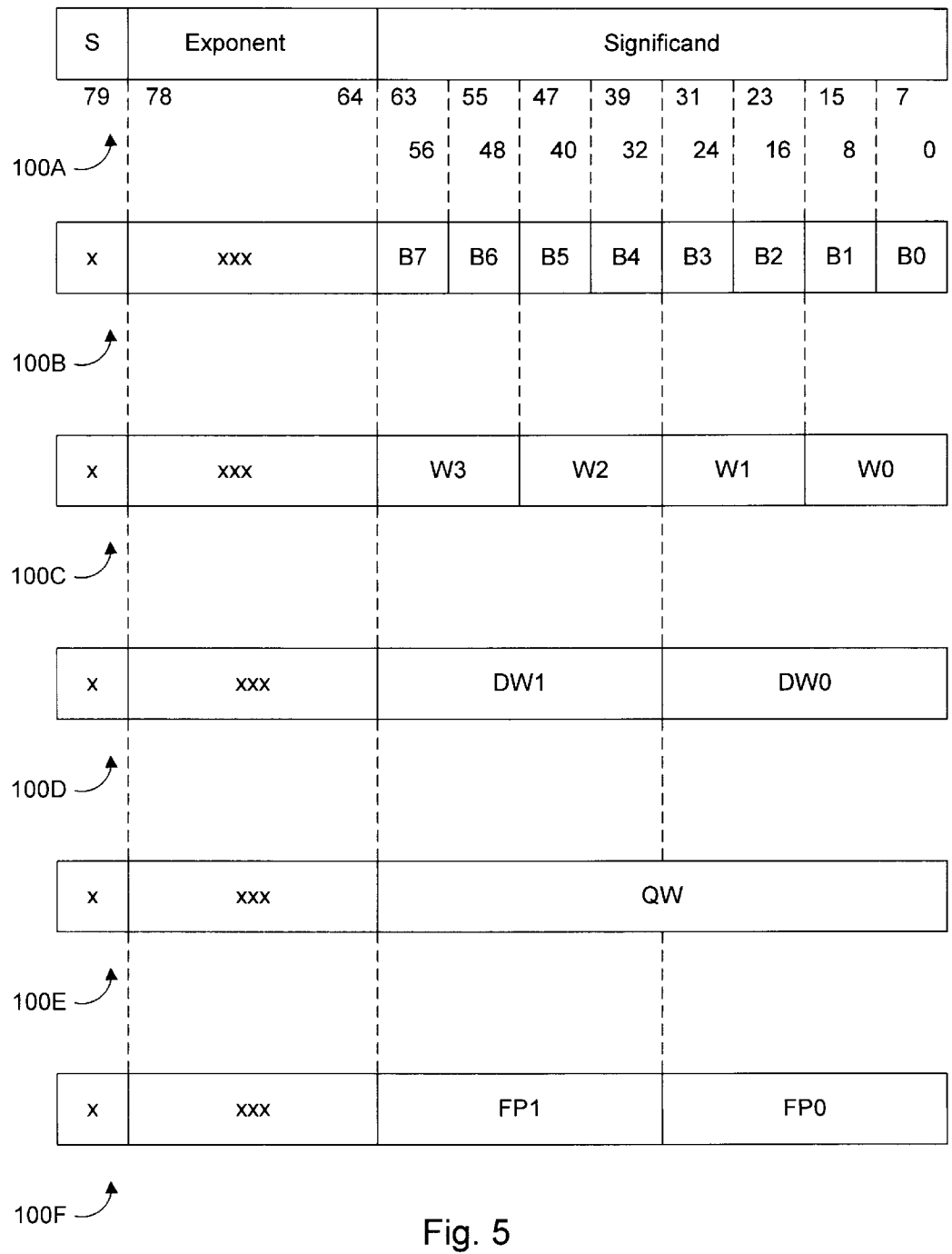
FIG. 5 is a diagram illustrating one embodiment of the architected formats for registers within one embodiment of the register file shown in FIG. 4.

Turning now to FIG. 5, a block diagram illustrating one embodiment of the architected formats 100A–100F for a floating point/multimedia shared register. Other embodiments are possible and contemplated. Format 100A is the format for floating point values. A one bit sign field, 15 bit exponent field, and 64 bit significand field are included in format 100A. The sign field indicates the positive/negative sign of the number (e.g. positive if the bit is clear, negative if the bit is set). The exponent field stores the exponent to which 2 is raised to multiply the significand by in order to arrive at the value of the number stored. The exponent is biased by a constant amount so that the exponent field is a positive number for any representable exponent value. The bias for format 100A may be 16,383. The significand field stores the significand of the number (also referred to as the mantissa). The most significant bit of the significand is to the left of the decimal point when interpreting the numerical value, and the remaining bits are to the right of the decimal point. For normal numbers, the bit to the left of the decimal point is one. For denormal numbers, the bit to the left of the decimal point is zero. Hence, the significand of a normal number has a numerical value between 1 and 2, exclusive of 2. The significand of a denormal number has a numerical value less than 1.

A denormal number is a number which is numerically too small to be represented by an exponent within the range supported by a particular precision. For example, the extended precision range is −16,382 to 16,383. In other words, the denormal number's exponent is less than −16,382 for extended precision denormal numbers. The denormal number is represented by right shifting the significand by the number of bits between the exponent of the denormal number (if expressed in normal form) and −16,382. The resulting significand, with the smallest exponent, is stored in format 100A.

Formats 100B–100F are various multimedia formats according to one embodiment of microprocessor 10. The corresponding bits between formats 100A–100F are indicated by the dashed vertical lines between the formats. In each of formats 100B–100F, the sign and exponent fields are don't cares. In other words, multimedia instructions do not attempt to interpret the sign and exponent fields. The significand field is interpreted in a variety of ways depending upon which multimedia instruction is selected.

Formats 100B–100E correspond to the MMX instruction set. MMX instructions are configured to operate in a single instruction, multiple data fashion upon one of the formats 100B–100E. Format 100B comprises eight "packed bytes". When format 100B is selected for a given instruction, the operation defined by the instruction is independently applied to each of the packed bytes. Format 100C comprises four "packed words" wherein a word is two bytes. Format 100D comprises two "packed double words" of four bytes each and format 100E comprises one "packed quadword" of eight bytes. Packed bytes, words, double words, and quadwords are all integer values.

Format 100F corresponds to a floating point instruction set optimized for three dimensional graphics operations. These instructions provide high performance floating point vector operations to enhance the performance of 3D graphics and other computationally intensive operations. The instructions interpret the significand field of the format 100F as two single precision floating point numbers (using the IEEE defined representation of single precision floating point numbers in 32 bits). The arithmetic is IEEE 754 compliant, and only the round to nearest even rounding mode is supported except for conversion to integer instructions, which use truncation. Additionally, results which would be positive or negative infinity in IEEE 754 arithmetic are clamped to the largest and smallest (most negative) representable values. Infinities, QNAN, and SNAN forms are not supported. Floating point exceptions are not generated and status flags are not updated. A variety of instructions including addition, subtraction, multiplication, division, etc. are supported.

As the vertical dashed line in FIG. 5 illustrates, multimedia instructions, if they are coded to consume data written by a floating point instruction, are defined to receive the significand portion of the number as represented in extended precision format. For example, if a multimedia instruction specifying packed bytes is executed and consumes floating point data, packed byte B7 receives bits 63 . . . 56 of the extended precision significand (which may be a denormal number). Similarly, packed byte B6 receives bits 55 . . . 48 of the extended precision significand, etc. Word W3 in format 100C corresponds to the same significand bits as bytes B7 and B6, etc., as illustrated by the dashed vertical lines in FIG. 5.

Figure 6:
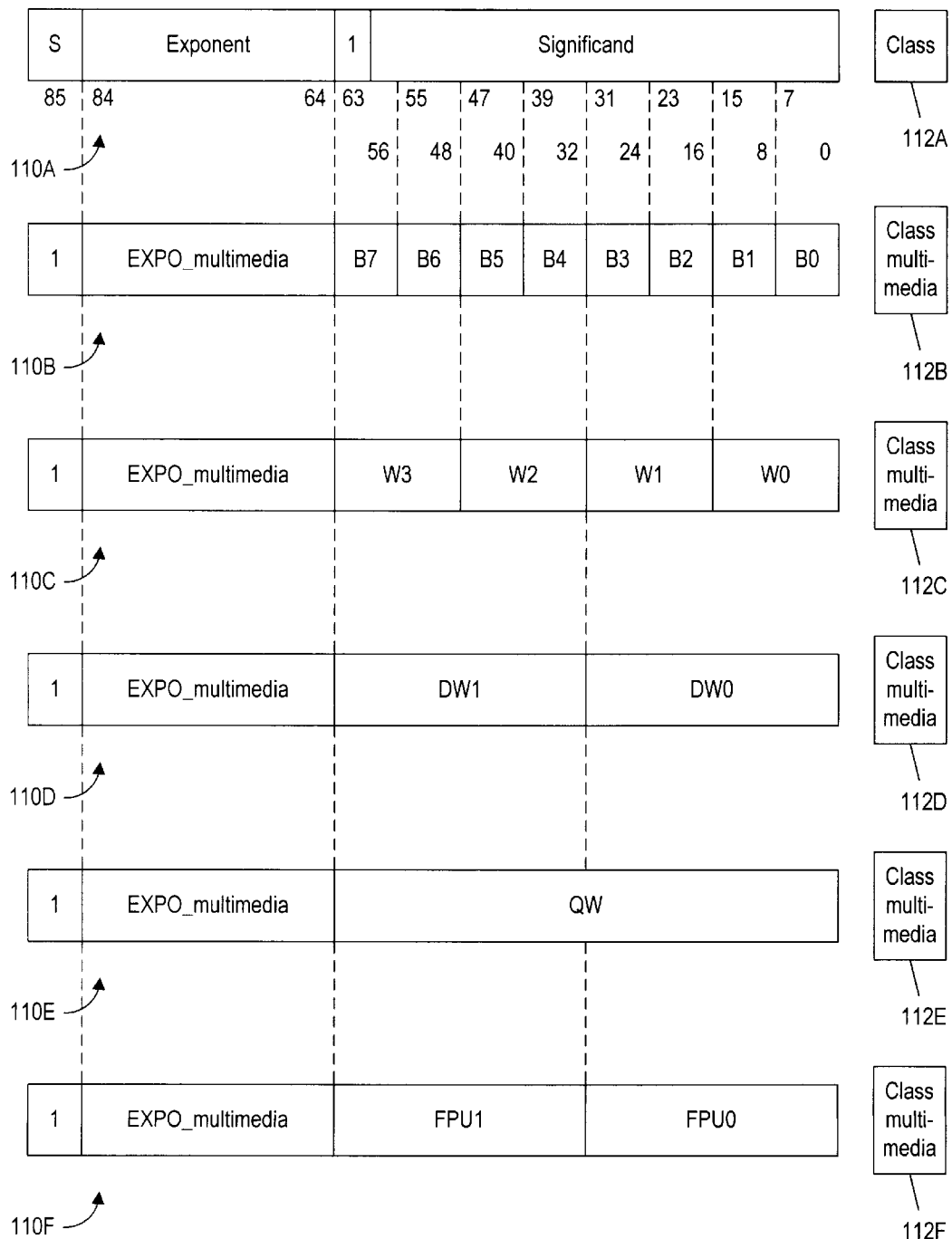
FIG. 6 is a diagram illustrating one embodiment of the implemented formats for the registers within one embodiment of the register file shown in FIG. 4.

FIG. 6 illustrates one embodiment of the internal formats implemented within one embodiment of register file 86. Other embodiments are possible and contemplated. As shown in FIG. 6, internal formats 110A–110F are 86 bit formats in which the exponent field has been increased by 6 bits as compared to formats 100A–100F. As a result, any floating point number which is representable as a denormal number in format 100A is representable as a normal number in format 110A. Hence, the most significant bit of the significand field is a binary 1 in floating point format 110A. In addition to the sign, exponent, and significand fields, each register includes a classification field (illustrated at reference numerals 112A–112F in FIG. 6. Classification field 112A may be set to an appropriate classification of the floating point number if the floating point number were expressed in the extended precision format shown in FIG. 5. For example, the class may be coded to denormal if the value stored in format 110A would be a denormal number if expressed in extended precision format. Similarly, the class may be coded as zero if the last update to a particular register was a zero result. As mentioned above, one embodiment of floating point unit 36 does not generate the zero representation in the exponent and significand fields. Instead, the class is simply coded to zero.

Formats 110B–110F correspond to the multimedia instruction set. As with formats 100B–100F shown in FIG. 5, the significand portion of the register is defined to contain the multimedia data. Additionally, the class field of each of formats 110B–110F is set to a predefined class indicating that the format is representing multimedia data.

Because format 110A stores floating point data in normal form for any extended precision number (including the extended precision denormal numbers), the significand portion of a register storing an extended precision denorm is not in the correct format to be consumed by a multimedia instruction. The multimedia instruction would generate results which are inconsistent with previous implementations of the x86 architecture. Additionally, the zero classification, because the significand is not necessarily updated to to zero, would generate inconsistent results. Similarly, data represented in multimedia form does not include the classification information used for floating point execution. However, the classification fields 112A–112F allow for rapid determination that the data is improperly formatted. The instruction is faulted if improperly formatted data is detected.

Formats 110B–110F further illustrate the values stored into the sign and exponent fields of a register storing multimedia data, according to the present embodiment. The sign field is set to one in response to the execution of a multimedia instruction. The exponent field is set to a predetermined value (EXPO_multimedia). The setting of the exponent field to the predetermined value allows for detection of a register which has actually been updated by a multimedia instruction (as opposed to being converted from floating point format 110A to one of formats 110B–110F in response to a multimedia instruction fault). According to one embodiment, EXPO_multimedia is encoded as all binary ones in the exponent field.

Figure 7:
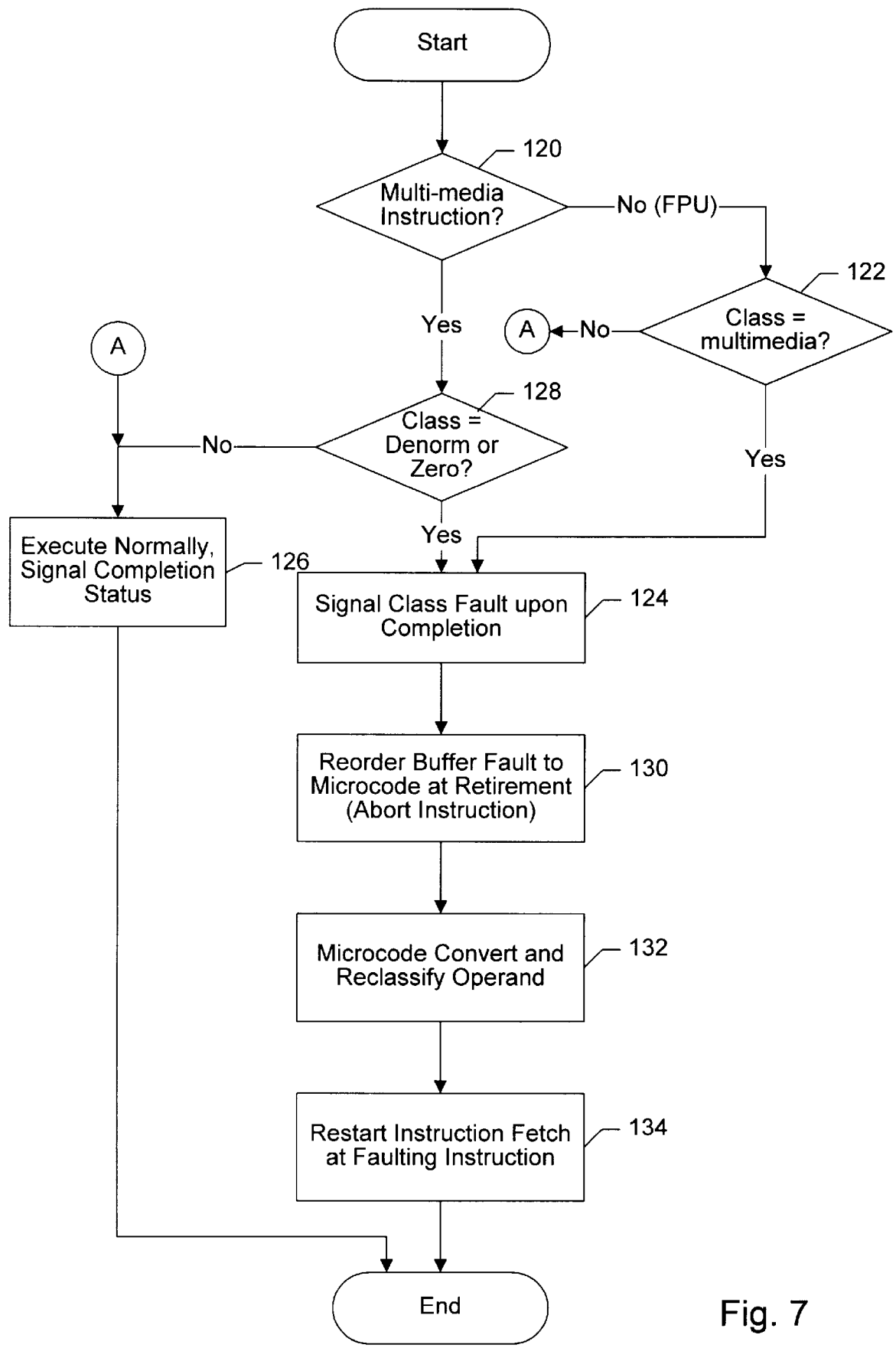
FIG. 7 is a flowchart illustrating operations performed according to one embodiment of the microprocessor shown in FIG. 1 when executing a floating point or multimedia instruction.

Turning now to FIG. 7, a flowchart illustrating one embodiment of overall behavior of microprocessor 10 when executing a floating point or multimedia instruction is shown. Other embodiments are possible and contemplated. If the instruction is a floating point instruction ("No" leg of decision block 120), the class of each source operand is analyzed by the floating point execution unit. If any of the source operands are classed as multimedia (decision block 122), then a class fault is signalled (step 124). Otherwise, the floating point instruction is executed normally, and the completion status is signalled based on the execution of the instruction (step 126). If, on the other hand, the instruction is a multimedia instruction ("Yes" leg of decision block 120), the class of each source operand is analyzed by the multimedia execution unit. If the class is coded to denorm or zero (decision block 128), then a class fault is signalled (step 124). Otherwise, the multimedia instruction is executed normally, and the completion status is signalled based on the execution of the instruction (step 126).

Upon selecting the faulting instruction for retirement, reorder buffer 32 detects the class fault status provided upon completion of the instruction (step 130). Reorder buffer 32 signals the fault to MROM unit 34, along with an entry point for the microcode routine to be executed. Alternatively, reorder buffer 32 may signal the type of fault to MROM unit 34 and MROM unit 34 may generate the entry point internally. Additionally, reorder buffer 32 signals an abort to FPU 36.

MROM unit 34 executes a routine to convert and reclassify at least the operand stored in the register which caused the fault (step 132). Several embodiments of step 132 are described below. As used herein, the term "microcode routine" refers to a set of instructions (stored in MROM unit 34) which, when executed in the order listed (or a suitable out of order execution which respects dependencies within the order), perform a desired function.

After reclassifying and converting, instruction fetch is directed to the faulting instruction (step 134). In this manner, the faulting instruction and subsequent instructions are executed. It is noted that, while the present embodiment describes performing conversion and reclassification via a microcode routine, any combination of hardware, microcode, and software may be used. Furthermore, step 134 may be accomplished by including a branch instruction at the end of the microcode routine. The target address of the branch instruction is the address of the faulting instruction.

Figure 8:
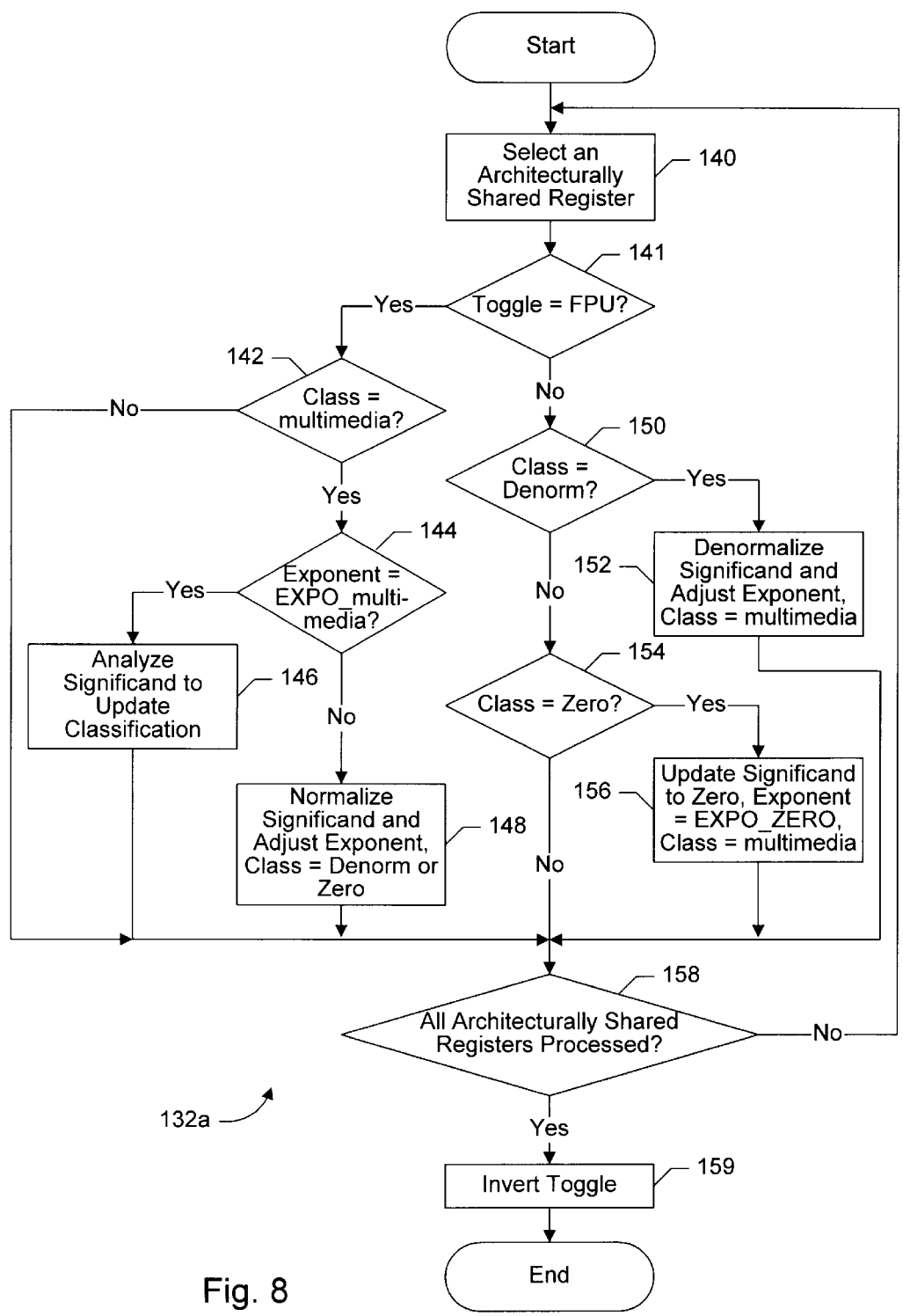
FIG. 8 is a flowchart illustrating one embodiment of a microcode routine or routines employed within one embodiment of the operations shown in FIG. 7.

Turning now to FIG. 8, a flowchart illustrating one embodiment of a microcode routine for performing one embodiment of step 132 (step 132a) is shown. Step 132a converts each register which is architecturally shared between floating point and multimedia instructions and which is classified as: (i) multimedia to a floating point class consistent with the data if a toggle bit maintained by the microcode routine indicates that the floating point format is desired; or (ii) denorm or zero to multimedia class if the toggle bit indicates that the multimedia format is desired. The toggle bit is inverted each time the microcode routine is executed, and the routine converts the architecturally shared registers into a target format selected by the toggle bit. In some cases, conversion may be performed to the wrong target format since the toggle bit is not information indicating which format is desired, but is simply the opposite format from the most recent invocation of the microcode routine. For such a case, the instruction will fault again after the conversion process. Since the toggle bit has been inverted, the second invocation of the microcode routine causes the correct target format to be provided. Accordingly, at most two faults are generated by an instruction attempting to consume data having a different format than the format selected by that instruction. In this manner, the register which caused the fault is converted without requiring any information about which register caused the fault or even which type of instruction was faulted (floating point or multimedia). Indicating which architected register caused the fault in a microarchitecture employing true register renaming and out of order execution can be complex, and hence the routine of FIG. 8 minimizes the amount of hardware employed to support the faulting mechanism. Additionally, the routine may be implemented as a single entry point, further simplifying the process and saving microcode ROM space. It is expected that the conversion process will be relatively infrequent, and hence it may be relatively slow to favor the simplicity.

In one embodiment, the toggle bit is stored in emulation memory which is private to MROM unit 34. Alternatively, a hardware register may be provided for storing the toggle bit. Furthermore, while the present discussion describes a toggle bit, any suitable sized value may be used. More particularly, multiple bits may be used if more than two data types architecturally share a register.

The routine selects an architecturally shared register (step 140). Depending upon the state of the toggle bit, steps 142–148 or steps 150–156 are performed. If the toggle bit indicates floating point format is desired (decision block 141) and the class is multimedia (decision block 142), then the routine examines the exponent field (decision block 144). If the exponent field is coded to EXPO_multimedia, then the value in the register is the result of executing a multimedia instruction. Therefore, the routine analyzes the significand to generate an appropriate floating point classification (step 146). In one embodiment, the resulting classification may be infinity, SNAN, QNAN, or unsupported. Unsupported is selected if the significand does not imply infinity, SNAN, or QNAN. On the other hand, if the exponent is not EXPO_multimedia, then the operand may have been converted by a previous execution of the microcode routine. Therefore, if the significand is in denorm form (most significant bit not set and at least one other bit set), the significand is normalized and the exponent is adjusted accordingly. The classification is updated to indicate denormal (or zero, if the exponent is encoded to a value indicated that the number is zero) (step 148). A particular value of the exponent is assigned to identify zero, referred to herein as EXPO_ZERO. Any suitable value may be selected. For example, a value of binary zeros in each exponent bit may be selected as EXPO_ZERO. Generally, special exponents are used in the present embodiment to recognize certain operands (e.g. EXPO_multimedia, EXPO_ZERO, and EXPO_DENORMAL for denormal numbers). Any suitable exponent encoding may be chosen for each special exponent.

If the toggle bit indicates multimedia, the routine determines if the class is denorm (decision block 150). If the class is denorm, the routine denormalizes the significand and adjusts the exponent until the exponent is within the extended precision range. The class is then set to multimedia (step 152).

If the class is not denorm, the routine determines if the class is zero (decision block 154). If the class is zero, the significand is set to zero and the exponent is set to EXPO_ZERO. The class is then set to multimedia (step 156).

In the present embodiment, if the class is not multimedia, zero, or denorm, then the significand portion of the register is the same as the corresponding extended precision significand. Accordingly, reformatting is not needed for the register. The register contents are not changed for this case.

The routine repeats the steps 141 through 156 for each architecturally shared register. Decision block 158 represents repeating each of the steps for each architecturally shared register. The toggle bit is inverted prior to ending step 132a (step 159) in order to ensure that the next invocation of the routine will perform conversion to the opposite format than the present invocation performs. It is noted that step 159 may be performed prior to converting each register or subsequent to converting each register, as desired.

A block of pseudocode which implements one embodiment of the flowchart shown as FIG. 8 is now provided. It is noted that the values listed in the #define statements are implementation specific and that any suitable values may be chosen:

```
movsr        tmp0, eip, serialize              ; get fault EIP
ld.w         tmp2, [FP_RECLASS_TOGL], em       ; get toggle bit from emulation mem.
xor.w.mc     tmp2, tmp2, 0xFFFFFFFF            ; invert toggle bit
mov.w        [FP_RECLASS_TOGL], tmp2, em       ; save new toggle encoding
jz           reclass_multimedia                ; reclass to multimedia if toggle=1
freclass     fabs0, fabs0, 0                   ; convert register 0 to FPU
nop
nop
freclass     fabs1, fabs1,0                    ; convert register 1 to FPU
nop
nop
freclass     fabs2, fabs2,0                    ; convert register 2 to FPU
nop
nop
freclass     fabs3, fabs3,0                    ; convert register 3 to FPU
nop
nop
freclass     fabs4, fabs4,0                    ; convert register 4 to FPU
nop
nop
freclass     fabs5, fabs5,0                    ; convert register 5 to FPU
nop
nop
freclass     fabs6, fabs6,0                    ; convert register 6 to FPU
nop
nop
freclass     fabs7, fabs7,0                    ; convert register 7 to FPU
nop
nop
jresync      tmp0, no_intchk                   ; restart faulting ins.
reclass_multimedia:
freclass     fabs0, fabs0,1                    ; convert register 0 to multimedia
nop
nop
freclass     fabs1, fabs1,1                    ; convert register 1 to multimedia
nop
nop
freclass     fabs2, fabs2,1                    ; convert register 2 to multimedia
nop
nop
freclass     fabs3, fabs3,1                    ; convert register 3 to multimedia
nop
nop
freclass     fabs4, fabs4,1                    ; convert register 4 to multimedia
nop
nop
freclass     fabs5, fabs5,1                    ; convert register 5 to multimedia
nop
nop
freclass     fabs6, fabs6,1                    ; convert register 6 to multimedia
nop
nop
freclass     fabs7, fabs7,1                    ; convert register 7 to multimedia
nop
nop
jresync      tmp0 no_intchk                    ; restart faulting ins.
```

The above routine employs nops between each invocation of the "freclass" operation in order to provide "freclass" operations to FPU 36 from decode unit 20A only (in the present embodiment). Other embodiments may not employ this manner of executing the "freclass" operations, if desired. FPU 36 receives the "freclass" operation in position zero (i.e. from decode unit 20A upon instruction bus 50A), and hence need only decode for the "freclass" operation in position zero (thereby reducing the hardware used to support the "freclass" operation).

The "freclass" operation shown in the above microcode routine is provided below in pseudo-code. The "freclass" operation may comprise an instruction executed by store execute unit 92 which is defined to operate according to the pseudocode shown below. Because store execute unit 92, in the present embodiment, accepts only single source instructions, the second source field of the freclass instruction is used to carry the toggle bit (e.g. as the least significant bit of the second source field). Schedule unit 82 detects the freclass instruction and conveys the value of the toggle bit from the second source field within the freclass instruction to store execute unit 92. In other embodiments, two different instruction opcode encodings may be used to indicate the value of the toggle bit (i.e. one encoding for converting from floating point format to multimedia format and another encoding for converting from multimedia format to floating point format).

```
freclass (dest, src1, toggle_bit):
#define EXPO_multimedia    18'h3FFFF
#define EXPO_ZERO          18'h00000
#define EXPO_DENORMAL      18'h1C001
#define multimedia_bit     1'h1
```

```
                                            -continued if (toggle_bit == multimedia_bit) { //convert to multimedia format
    if (src1.class == denorm) {
        shiftcount = EXPO_DENORMAL - src1.expo
        dest.mant<67:4> = src1.mant<67:4> >> shiftcount
        dest.expo = EXPO_DENORMAL
        dest.class = multimedia
        dest.sign = src1.sign
    }
    else if (src1.class == zero) {
        dest.mant = 68'h00000000000000000
        dest.expo = EXPO_ZERO
        dest.class = multimedia
        dest.sign = src1 .sign
    }
    else {
        dest = src1
    }
}
else {
    if (src1.class == multimedia) {
        if (src1.expo == EXPO_multimedia) {
            dest.sign = src1.sign
            if (src1.mant<67:4> = 64'h8000000000000000) {
                dest.class = infinity
            }
            else if (src1.mant<67:66 >== 2'b10) {
                dest.class = SNAN
            }
            else if (src1.mant<67:66 >== 2'b11) {
                dest.class = QNAN
            }
            else {
                dest.class = unsupported
            }
        }
        else if (src1.exp == EXPO_ZERO) {
            dest.class = zero
        }
        else {
            dest.sign = src1.sign
            dest.class = denorm
            shiftcount = pencode (src1.mant)
            dest.mant = src1.mant << shiftcount
            dest.expo = src1.expo - shiftcount
        }
    }
    else {
        dest = src1
    }
}
```

Figure 9A:
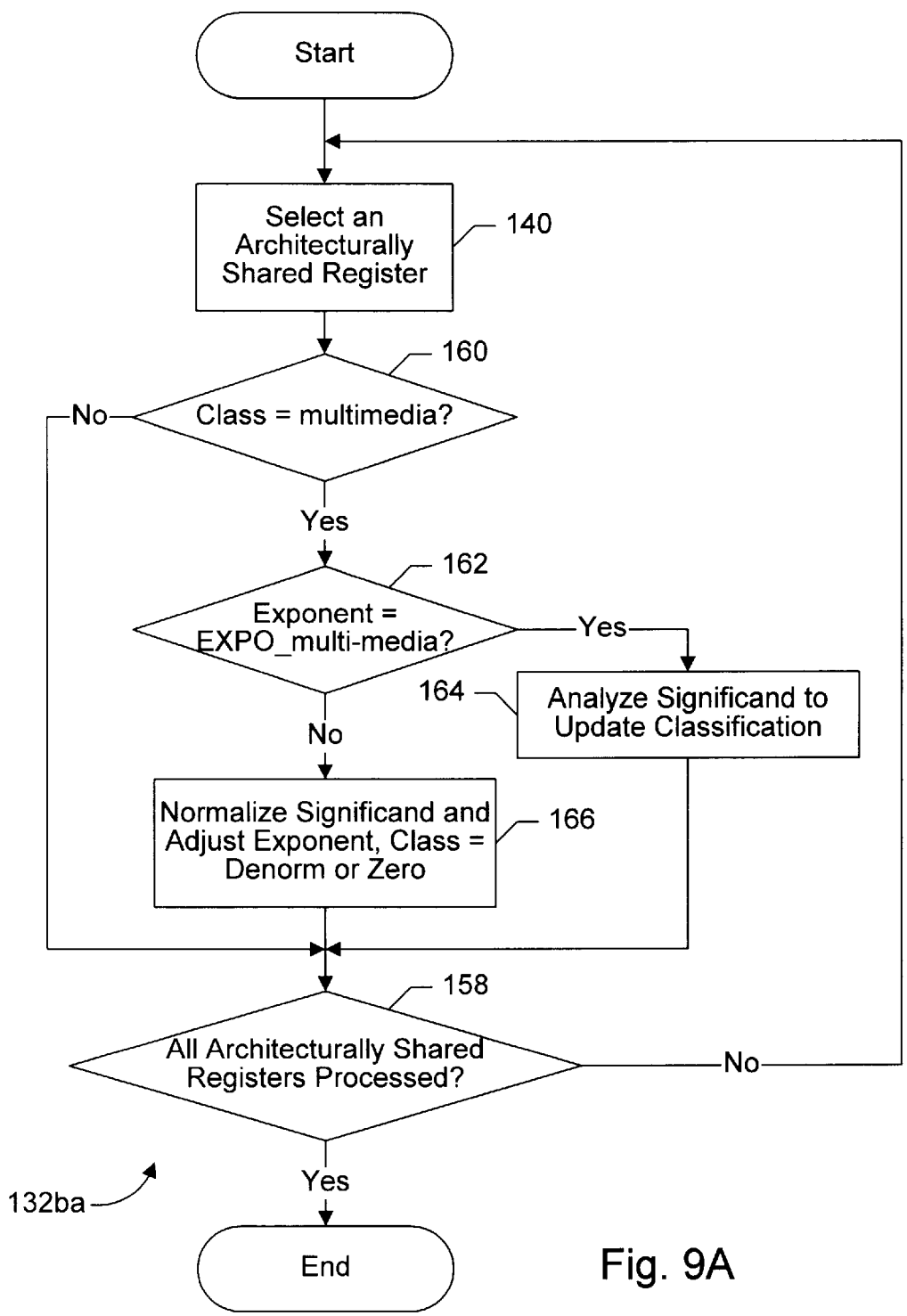
FIGS. 9A and 9B are flowcharts illustrating a second embodiment of a microcode routine or routines employed within one embodiment of the operations shown in FIG. 7.
Figure 9B:
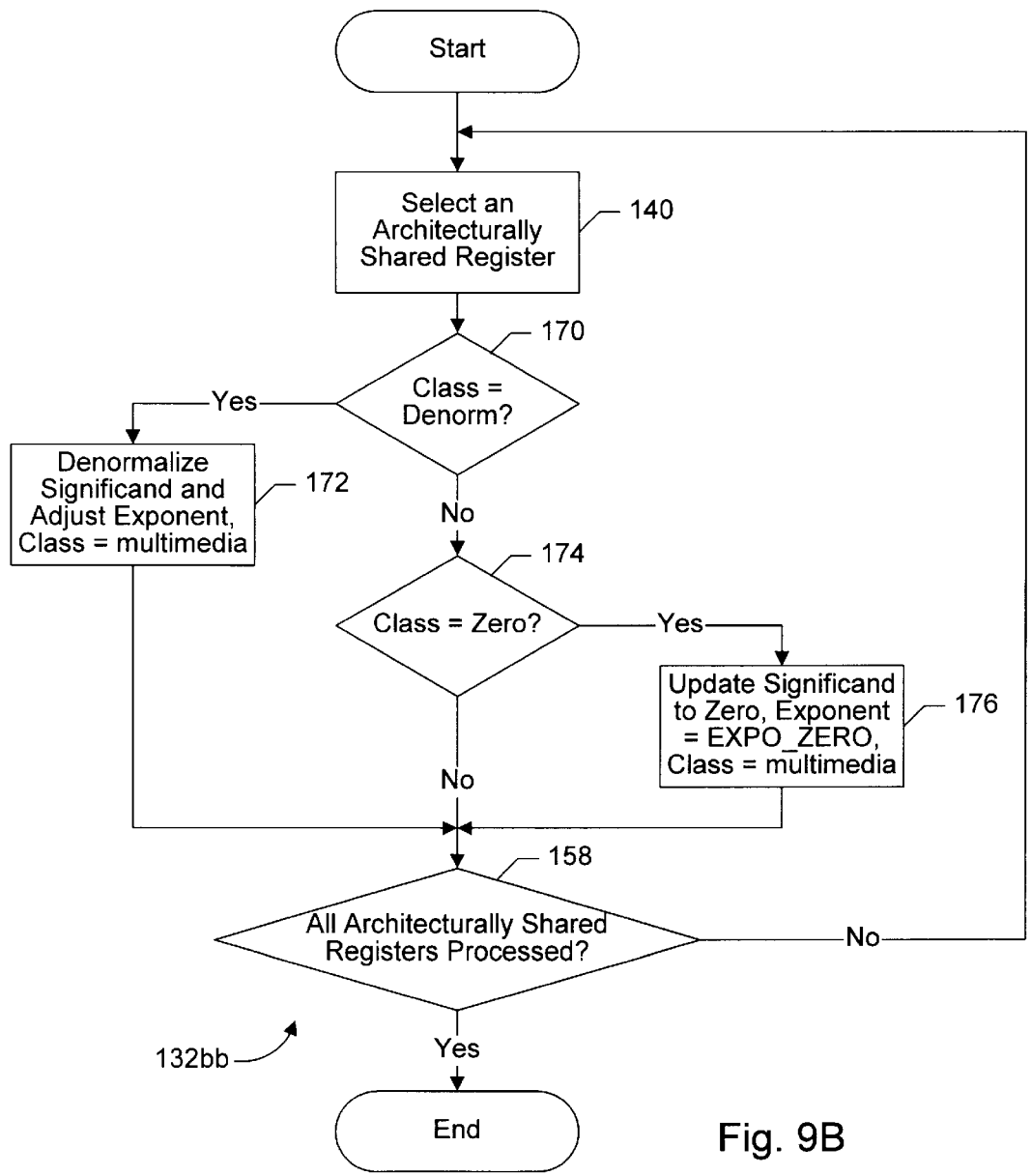

Turning next to FIGS. 9A and 9B, a second embodiment of step 132 (step 132*b*, represented by portions 132*ba* in FIG. 9A and 132*bb* in FIG. 9B) is shown. Step 132*b* either converts data classed as multimedia to a corresponding floating point class or converts data classed as denorm or zero to multimedia class, depending upon which type of instruction was faulted. Accordingly, step 132*b* receives information regarding the type of instruction which was faulted. However, which architected register caused the fault is not provided to the routine. Portion 132*ba* and portion 132*bb* may be implemented at separate entry points in the microcode, or may be implemented as a single entry point if a register is updated with the type of the faulting instruction, and the routine at the entry point reads the register to choose portion 132*ba* or 132*bb* for execution. Portion 132*ba* is executed if the faulting instruction is a floating point instruction and portion 132*bb* is executed if the faulting instruction is a multimedia instruction.

As illustrated by steps 140 and 158 similar to FIG. 8, the routine represented by either FIG. 9A or FIG. 9B (depending upon the type of the faulting instruction) is repeated for each architecturally shared register. If portion 132*ba* is being executed, the classification of the selected register is examined. If the class is not multimedia, the register is left unchanged (decision block 160). On the other hand, if the class is multimedia, the exponent field is examined (decision block 162). If the exponent field is coded to EXPO_multimedia, then the value in the register is the result of executing a multimedia instruction. Therefore, the routine analyzes the significand to generate an appropriate floating point classification (step 164). In one embodiment, the resulting classification may be infinity, SNAN, QNAN, or unsupported. Unsupported is selected if the significand does not imply infinity, SNAN, or QNAN. On the other hand, if the exponent is not EXPO_multimedia, then the operand may have been converted by a previous execution of the microcode routine. Therefore, if the significand is in denorm form (most significant bit not set and at least one other bit set), the significand is normalized and the exponent is adjusted accordingly. The classification is updated to indicate denormal (or zero, if the exponent is EXPO_ZERO) (step 166).

If portion 132*bb* is being executed, the classification of the selected register is examined (decision block 170). If the class is denorm, the routine denormalizes the significand and adjusts the exponent until the exponent is within the extended precision range. The class is then set to multimedia (step 172). If the class is not denorm, the routine determines if the class is zero (decision block 174). If the class is zero, the significand is set to zero and the exponent is set to EXPO_ZERO. The class is then set to multimedia (step 176). If the class is not denorm or zero, the register contents are not modified. As mentioned above, steps 170–176 are repeated for each architecturally shared register.

Figure 10A:
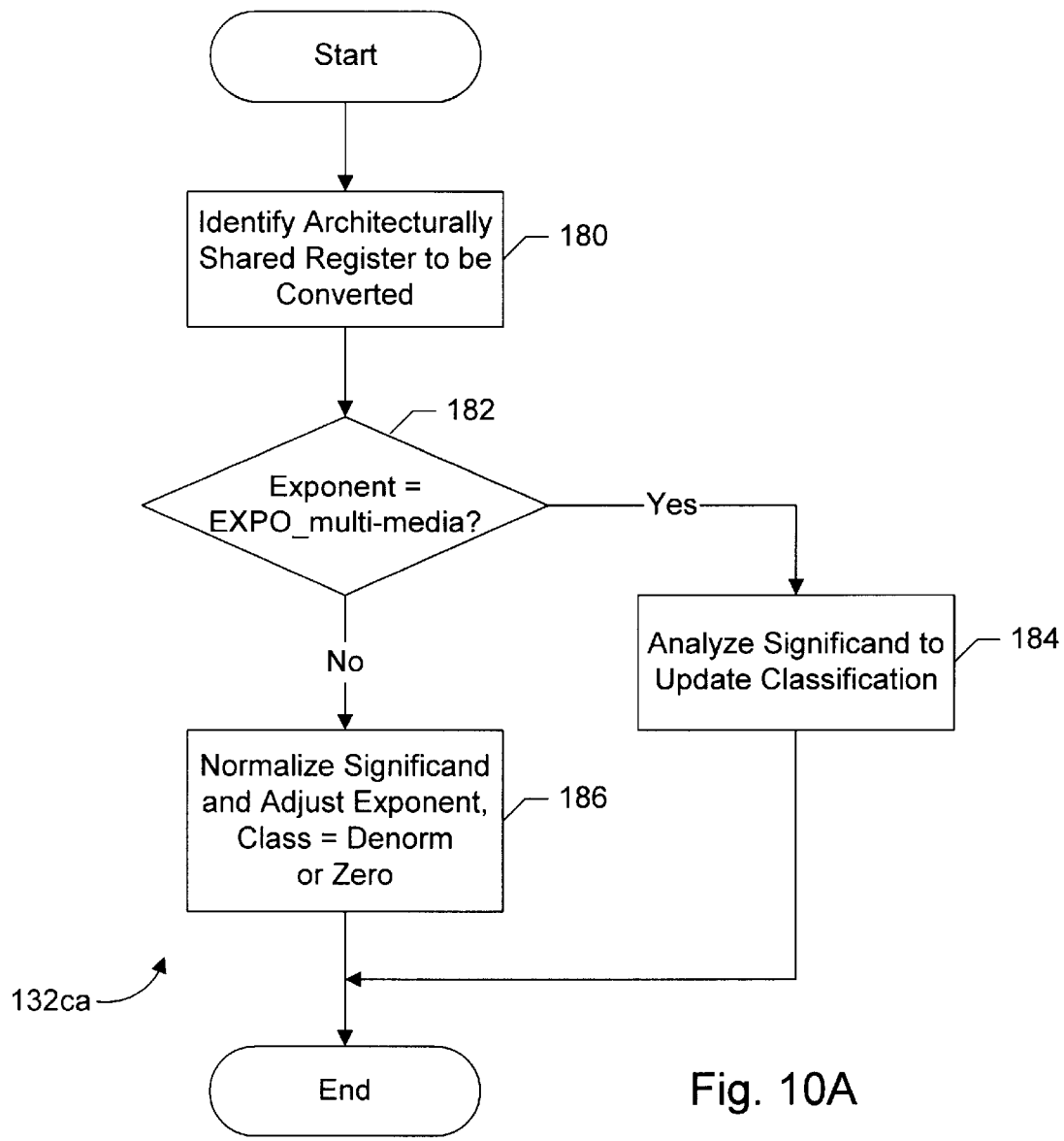
FIGS. 10A and 10B are flowcharts illustrating a third embodiment of a microcode routine or routines employed within one embodiment of the operations shown in FIG. 7.
Figure 10B:
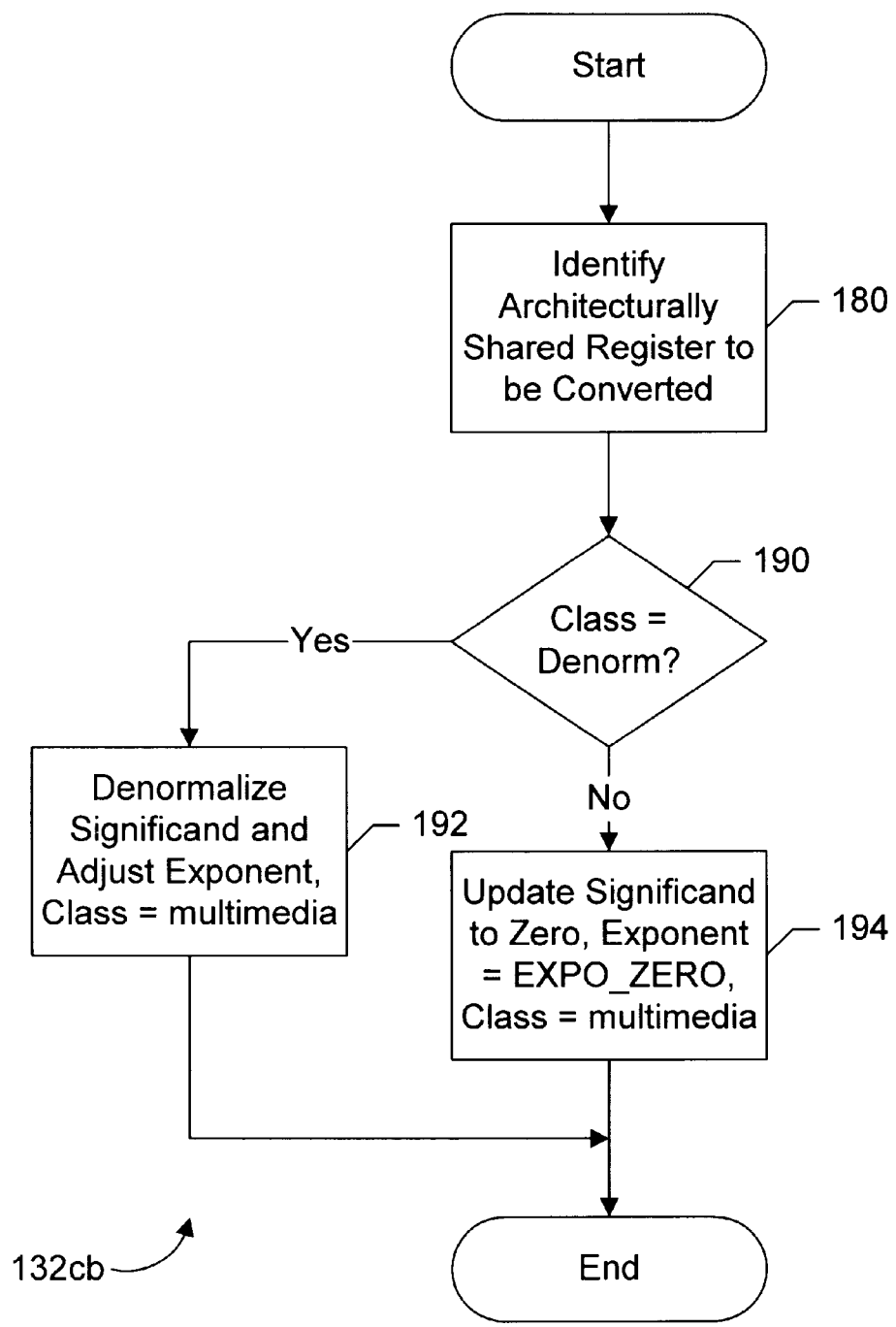

Turning now to FIGS. 10A and 10B, a third embodiment of step 132 (step 132*c*, represented by portions 132*ca* in FIG. 10A and 132*cb* in FIG. 10B) is shown. Step 132*c* performs the conversion only for the source register(s) of the faulting instruction. Additionally, step 132*c* is provided with the type of the faulting instruction to determine whether to execute portion 132*ca* (floating point instruction) or portion 132*cb* (multimedia instruction).

Portions 132*ca* and 132*cb* both begin by identifying the register to be converted (step 180). Step 180 may be implemented in a number of ways. For example, an indication of the registers requiring conversion can be stored into a register read by the routine implementing step 132*c*, and the steps can be performed for each register. Alternatively, an entry point may be provided for each possible combination of source registers, and the code at that entry point performs the conversion for those registers. In yet another alternative, one entry point per register may be allocated. If an instruction requires conversion of more than one source register, that instruction may fault several times.

Once the register to be converted has been identified, portion 132*ca* examines the exponent portion of the register (decision block 182). If the exponent field is coded to EXPO_multimedia, then the value in the register is the result of executing a multimedia instruction. Therefore, the routine analyzes the significand to generate an appropriate floating point classification (step 184). In one embodiment, the resulting classification may be infinity, SNAN, QNAN, or unsupported. Unsupported is selected if the significand does not imply infinity, SNAN, or QNAN. On the other hand, if the exponent is not EXPO_multimedia, then the operand may have been converted by a previous execution of the microcode routine. Therefore, if the significand is in denorm form (most significant bit not set and at least one other bit set), the significand is normalized and the exponent is adjusted accordingly. The classification is updated to indicate denormal (or zero, if the exponent is EXPO_ZERO) (step 186).

Portion 132cb begins with step 180, similar to portion 132ca. Once the register to be converted has been identified, portion 132cb examines the class of the register (decision block 190). If the class is denorm, the routine denormalizes the significand and adjusts the exponent until the exponent is within the extended precision range. The class is then set to multimedia (step 192). If the class is not denorm, the class is zero since the fault is taken for a multimedia instruction if the class is either denorm or zero. The significand is set to zero and the exponent is set to EXPO_ZERO. The class is then set to multimedia (step 194).

While the flowcharts shown herein have illustrated a series of steps in a particular order for each of understanding, any suitable order may be used to achieve equivalent results. Additionally, if the flowcharts are implemented in hardware, the steps may be performed in parallel in any suitable fashion.

Figure 11:
FIG. 11 is a table illustrating one embodiment of encodings for a classification field shown in FIG. 6.

Turning now to FIG. 11, a table 198 is shown illustrating an exemplary set of classes which may be employed by one embodiment of FPU 36. The class is listed in the first column, followed by the type of data which uses that class, and the encoding of the classification field for that class. SNAN, normal, infinity, zero, QNAN, and denorm encodings are each floating point encodings corresponding to floating point data formats as defined in IEEE 754 and 854 standards. The unsupported class is used to classify any encodings that are not class normal, denormal, infinity, SNAN, QNAN, or zero. The unsupported encoding causes an invalid exception to occur if a floating point instruction using the value as a source operand. For embodiments employing the x86 instruction set, certain encodings in the extended precision are redundant and are marked unsupported. In one particular embodiment, the set of encodings which are unsupported are the same as those defined by the Pentium microprocessor from Intel Corporation. Finally, the multimedia class identifies multimedia data.

Figure 12:
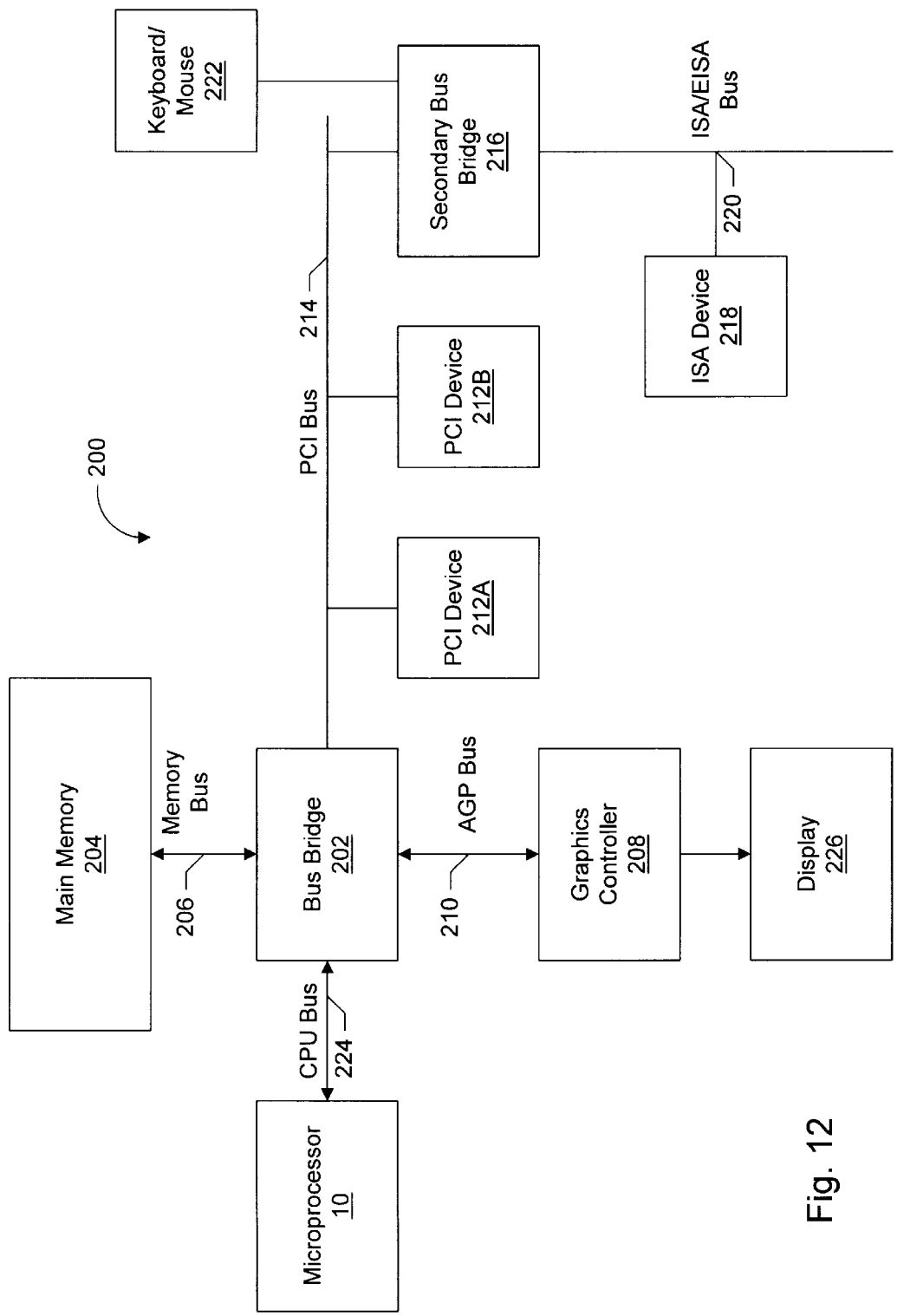
FIG. 12 is a block diagram of one embodiment of a computer system including the microprocessor shown in FIG. 1.

Turning now to FIG. 12, a block diagram of a computer system 200 including microprocessor 10 coupled to a variety of system components through a bus bridge 202 is shown. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Microprocessor 10 is coupled to bus bridge 202 through a CPU bus 224.

In addition to providing an interface to an ISA/EISA bus, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between microprocessor 10 and bus bridge 202 in other embodiments. Alternatively, the external cache may be coupled to bus bridge 202 and cache control logic for the external cache may be integrated.

Main memory 204 is a memory in which application programs are stored and from which microprocessor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bridge logic unit 102 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 302 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

In accordance with the above disclosure, a microprocessor has been shown which shares one or more registers between execution units which execute instructions operating upon different data types. Consumption of data of one type by an instruction of another type is detected, and the data is converted to a format which preserves compatibility between the microprocessor and previous implementations of the architecture implemented by the processor. An internal format for one or both of the data types may therefore be used, advantageously allowing for optimization of hardware in one or both of the execution units by taking advantage of the internal format.

Numerous variations and modifications will become apparent to those skilled in the art once the above disclosure is fully appreciated. It is intended that the following claims be interpreted to embrace all such variations and modifications.

What is claimed is:

1. A method for managing access to one or more registers which are shared by a first execution unit of a first type and a second execution unit of a second type different than said first type, the method comprising:

updating a first register within said one or more registers responsive to a first instruction executed in said first execution unit;

faulting a second instruction executable by said second execution unit, said second instruction having said first register as a source operand, said faulting comprising flushing said second instruction and instructions subsequent to said second instruction;

converting data stored in said first register from a first format used by said first execution unit to a second format used by said second execution unit responsive to said faulting; and executing said second instruction subsequent to said converting.

2. The method as recited in claim 1 wherein said first execution unit comprises a multimedia unit configured to execute multimedia instructions.

3. The method as recited in claim 2 wherein said first format comprises two or more multimedia values stored in a significand portion of said first register and a predetermined exponent encoding in an exponent portion of said first register, and a classification field encoded to a multimedia encoding.

4. The method as recited in claim 3 wherein said second execution unit comprises a floating point unit configured to execute floating point instructions.

5. The method as recited in claim 4 wherein said second format comprises a normalized floating point number and a classification of said number in a predefined precision different from a precision within said first register.

6. The method as recited in claim 5 wherein said predefined precision is an extended precision format defined in an architecture implemented by a microprocessor including said first execution unit and said second execution unit.

7. The method as recited in claim 6 wherein said faulting comprises detecting that said classification field is storing said multimedia encoding.

8. The method as recited in claim 1 wherein said converting is performed by a microcode unit.

9. A method for managing access to one or more registers which are shared by a first execution unit of a first type and a second execution unit of a second type different than said first type, the method comprising:

updating a first register within said one or more registers responsive to a first instruction executed in said first execution unit, wherein said first execution unit comprises a floating point unit configured to execute floating point instructions;

faulting a second instruction executable by said second execution unit, said second instruction having said first register as a source operand;

converting data stored in said first register from a first format used by said first execution unit to a second format used by said second execution unit responsive to said faulting; and executing said second instruction subsequent to said converting.

10. The method as recited in claim 9 wherein said first format comprises a normalized floating point number and a classification of said number in a predefined precision different from a precision within said first register.

11. The method as recited in claim 10 wherein said predefined precision is an extended precision format defined in an architecture implemented by a microprocessor including said first execution unit and said second execution unit.

12. The method as recited in claim 10 wherein said second execution unit comprises a multimedia unit configured to execute multimedia instructions.

13. The method as recited in claim 12 wherein said second format comprises said number expressed in said predefined precision if said number is a result of a floating point instruction.

14. The method as recited in claim 13 wherein said classification includes an encoding that said first register is in said second format.

15. The method as recited in claim 14 wherein said faulting comprises determining that said classification is not in said encoding.

16. The method as recited in claim 15 wherein said determining comprises determining that said classification is one of: denorm or zero.

17. A method for managing access to one or more registers which are shared by a first execution unit of a first type and a second execution unit of a second type different than said first type, the method comprising:

updating a first register within said one or more registers responsive to a first instruction executed in said first execution unit;

faulting a second instruction executable by said second execution unit, said second instruction having said first register as a source operand;

converting data stored in said first register from a first format used by said first execution unit to a second format used by said second execution unit responsive to said faulting, wherein said converting is performed by a microcode unit, and wherein said microcode unit comprises a routine which converts each of said one or more registers which is storing said first format to said second format if a toggle maintained by said routine is in a first state, and which converts each of said one or more registers which is storing said second format to said first format if said toggle is in a second state; and executing said second instruction subsequent to said converting.

18. The method as recited in claim 17 further comprising changing said toggle from said first state to said second state if said toggle is in said first state and changing said toggle from said second state to said first state if said toggle is in said second state.

19. A microprocessor comprising:

at least one register accessible responsive to both a first type of instructions and a second type of instructions;

a first execution unit configured to execute said first type of instructions, wherein said first execution unit is configured to store a result from executing said first type of instructions into said at least one register in a first format, and wherein said first execution unit is configured to fault a first instruction of said first type which accesses said at least one register if said at least one register is storing data in a second format different from said first format;

a second execution unit configured to execute said second type of instructions, wherein said second execution unit is configured to store a result from executing said second type of instructions into said at least one register in said second format, and wherein said second execution unit is configured to fault a second instruction of said second type which accesses said at least one register if said at least one register is storing data in said first format;

a reorder buffer coupled to said first execution unit and said second execution unit, wherein said reorder buffer is configured to signal a microcode unit upon selecting said first instruction or said second instruction for retirement; and said microcode unit configured to dispatch a routine responsive to said signal from said reorder buffer.

20. The microprocessor as recited in claim 19 wherein said first execution unit comprises a floating point execution unit and said second execution unit comprises a multimedia execution unit.

21. The microprocessor as recited in claim 20 wherein said first format comprises a normalized floating point number and a classification of said number in a predefined precision different from a precision within said at least one register.

22. The microprocessor as recited in claim 21 wherein said predefined precision is an extended precision format defined in an architecture implemented by said microprocessor.

23. The microprocessor as recited in claim 21 wherein said routine comprises instructions to convert said normalized floating point number to a second number expressed in said predefined precision.

24. The microprocessor as recited in claim 21 wherein said second execution unit is configured not to fault said second instruction if said classification indicates that said normalized floating point number is also a normalized floating point number in said predefined precision.

25. The microprocessor as recited in claim 20 wherein said second format comprises two or more multimedia values stored in a significand portion of said first register, a predetermined exponent encoding in an exponent portion of said first register, and a classification field encoded to a multimedia encoding.

26. The microprocessor as recited in claim 25 wherein said routine includes instructions to convert said second format to said first format which includes a normalized floating point number in a first precision and a classification of said number in a predefined precision different from said first precision.

27. The microprocessor as recited in claim 6 wherein said predefined precision is an extended precision format defined in an architecture implemented by said microprocessor.

28. The microprocessor as recited in claim 19 wherein said routine comprises instructions to convert each register accessible to both said first type of instructions and said second type of instructions which is in said first format to said second format if a toggle maintained by said routine is in a first state, and to convert said each register accessible to both said first type of instructions and said second type of instructions which is in said second format to said first format if said toggle is in a second state.

29. The microprocessor as recited in claim 28, wherein said routine further comprises instructions to change said toggle from said first state to said second state if said toggle is in said first state and to change said toggle from said second state to said first state if said toggle is in said second state.

30. The microprocessor as recited in claim 19 wherein said routine comprises instructions to convert each register accessible to both said first type of instructions and said second type of instructions which is in said first format to said second format if said second instruction is faulted, and wherein said routine comprises instructions to convert said each register accessible to both said first type of instructions and said second type of instructions which is in said second format to said first format if said first instruction is faulted.

31. The microprocessor as recited in claim 30 wherein said routine comprises:
  (i) a first routine comprising said instructions to convert each register accessible to both said first type of instructions and said second type of instructions which is in said first format to said second format; and
  (ii) a second, separate routine comprising said instructions to convert said each register accessible to both said first type of instructions and said second type of instructions which is in said second format to said first format;
  wherein said first routine is selected if said second instruction is faulted and said second routine is selected if said first instruction is faulted.

32. The microprocessor as recited in claim 19 wherein said routine comprises instruction to convert only said at least one register which caused said fault.

33. A computer system comprising:
  a microprocessor comprising:
    at least one register accessible responsive to both a first type of instructions and a second type of instructions;
    a first execution unit configured to execute said first type of instructions, wherein said first execution unit is configured to store a result from executing said first type of instructions into said at least one register in a first format, and wherein said first execution unit is configured to fault a first instruction of said first type which accesses said at least one register if said at least one register is storing data in a second format different from said first format;
    a second execution unit configured to execute said second type of instructions, wherein said second execution unit is configured to store a result from executing said second type of instructions into said at least one register in said second format, and wherein said second execution unit is configured to fault a second instruction of said second type which accesses said at least one register if said at least one register is storing data in said first format;
    a reorder buffer coupled to said first execution unit and said second execution unit, wherein said reorder buffer is configured to signal a microcode unit upon selecting said first instruction or said second instruction for retirement; and
    said microcode unit configured to dispatch a routine responsive to said signal from said reorder buffer; and
  an input/output (I/O) device configured to communicate between said computer system and another computer system to which said I/O device is couplable.

34. The computer system as recited in claim 33 wherein said I/O device is a modem.

35. The computer system as recited in claim 33 further comprising an audio I/O device.

36. The computer system as recited in claim 35 wherein said audio I/O device comprises a sound card.

37. The computer system as recited in claim 33 wherein said first execution unit comprises a floating point execution unit and said second execution unit comprises a multimedia execution unit.

38. The computer system as recited in claim 37 wherein said first format comprises a normalized floating point number and a classification of said number in a predefined precision different from a precision within said at least one register.

39. The computer system as recited in claim 38 wherein said predefined precision is an extended precision format defined in an architecture implemented by said microprocessor.

40. The computer system as recited in claim 38 wherein said routine comprises instructions to convert said normalized floating point number to a second number expressed in said predefined precision.

41. The computer system as recited in claim 38 wherein said second execution unit is configured not to fault said second instruction if said classification indicates that said normalized floating point number is also a normalized floating point number in said predefined precision.

42. The computer system as recited in claim 37 wherein said second format comprises two or more multimedia values stored in a significand portion of said first register and a predetermined exponent encoding in an exponent portion of said first register, and a classification field encoded to a multimedia encoding.

43. The computer system as recited in claim 42 wherein said routine includes instructions to convert said second format to said first format which includes a normalized floating point number in a first precision and a classification of said number in a predefined precision different from said first precision.

44. The computer system as recited in claim 43 wherein said predefined precision is an extended precision format defined in an architecture implemented by said microprocessor.

45. The computer system as recited in claim 33 wherein said routine comprises instructions to convert each register accessible to both said first type of instructions and said second type of instructions which is in said first format to said second format if a toggle maintained by said routine is in a first state, and to convert said each register accessible to both said first type of instructions and said second type of instructions which is in said second format to said first format if said toggle is in a second state.

46. The computer system as recited in claim 45, wherein said routine further comprises instructions to change said toggle from said first state to said second state if said toggle is in said first state and to change said toggle from said second state to said first state if said toggle is in said second state.

47. The computer system as recited in claim 33 wherein said routine comprises instructions to convert each register accessible to both said first type of instructions and said second type of instructions which is in said first format to said second format if said second instruction is faulted, and wherein said routine comprises instructions to convert said each register accessible to both said first type of instructions and said second type of instructions which is in said second format to said first format if said first instruction is faulted.

48. The computer system as recited in claim 47 wherein said routine comprises:
 (i) a first routine comprising said instructions to convert each register accessible to both said first type of instructions and said second type of instructions which is in said first format to said second format; and
 (ii) a second, separate routine comprising said instructions to convert said each register accessible to both said first type of instructions and said second type of instructions which is in said second format to said first format;
 wherein said first routine is selected if said second instruction is faulted and said second routine is selected if said first instruction is faulted.

49. The computer system as recited in claim 33 wherein said routine comprises instructions to convert only said at least one register which caused said fault.

* * * * *

UNITED STATES PATENT AND TRADEMARK OFFICE
CERTIFICATE OF CORRECTION

PATENT NO. : 6,105,129
DATED : August 15, 2000
INVENTOR(S) : Stephan G. Meier, Norbert Juffa, Michael D. Achenbach, Frederick D. Weber It is certified that error appears in the above-indentified patent and that said Letters Patent is hereby corrected as shown below:

Claim 27, col. 31, line 47, please delete "6" and insert --26-- in place thereof.

Signed and Sealed this

Twenty-fourth Day of April, 2001

Attest:

NICHOLAS P. GODICI

Attesting Officer

Acting Director of the United States Patent and Trademark Office